US011733854B2

(12) United States Patent
Cho

(10) Patent No.: US 11,733,854 B2
(45) **Date of Patent: *Aug. 22, 2023**

(54) METHOD FOR GENERATING AND REPRODUCING MULTIMEDIA CONTENT, ELECTRONIC DEVICE FOR PERFORMING SAME, AND RECORDING MEDIUM IN WHICH PROGRAM FOR EXECUTING SAME IS RECORDED

(71) Applicant: Eunhyung Cho, Seoul (KR)

(72) Inventor: Eunhyung Cho, Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 17/958,366

(22) Filed: Oct. 1, 2022

(65) Prior Publication Data

US 2023/0027161 A1 Jan. 26, 2023

Related U.S. Application Data

(63) Continuation of application No. 17/396,537, filed on Aug. 6, 2021, now Pat. No. 11,507,265, which is a (Continued)

(30) Foreign Application Priority Data

Dec. 15, 2014 (KR) ........................ 10-2014-0180219

(51) Int. Cl.
*G06F 3/04847* (2022.01)
*H04N 21/4402* (2011.01)
(Continued)

(52) U.S. Cl.
CPC ........ *G06F 3/04847* (2013.01); *G06F 3/0485* (2013.01); *H04N 21/41407* (2013.01);
(Continued)

(58) Field of Classification Search
CPC .................................................. G06F 3/04847
(Continued)

(56) References Cited

U.S. PATENT DOCUMENTS 4,829,294 A * 5/1989 Iwami ...................... G09G 5/14 715/204
5,917,480 A * 6/1999 Tafoya ...................... G06T 1/00 715/732

(Continued)

FOREIGN PATENT DOCUMENTS

JP 2013-201606 A 10/2013
KR 10-2001-0037647 A 5/2001

(Continued)

OTHER PUBLICATIONS

Notice of Allowance dated Oct. 4, 2022 as received in Korean application No. 10-2021-0142611.

(Continued)

*Primary Examiner* — Reza Nabi
(74) *Attorney, Agent, or Firm* — Maschoff Brennan

(57) ABSTRACT

Method for displaying multimedia content, electronic device for performing same, and recording medium in which program for executing same is recorded are disclosed. In one embodiment, a method for displaying multimedia content comprises acquiring multimedia content including video data which is reproduced as a video, and slide data including a key scene which is matched with event time point in a reproduction time period of the video data and is displayed in a slideshow manner, acquiring a text data corresponding to the multimedia content, displaying the multimedia content in a first area according to a video mode for reproducing the video data as the video or a slideshow mode for displaying the key scene in the slideshow manner, displaying at least a portion of the text data in a second area; and
(Continued)

adjusting the displayed text data according to the displayed multimedia content.

12 Claims, 41 Drawing Sheets

Related U.S. Application Data continuation of application No. 16/863,941, filed on Apr. 30, 2020, now Pat. No. 11,112,960, which is a continuation of application No. 15/536,639, filed as application No. PCT/KR2015/013773 on Dec. 15, 2015, now Pat. No. 10,678,415.

(51) Int. Cl.
*H04N 21/431* (2011.01)
*H04N 21/8547* (2011.01)
*H04N 21/488* (2011.01)
*H04N 21/414* (2011.01)
*G06F 3/0485* (2022.01)
*H04N 21/472* (2011.01)
*H04N 21/422* (2011.01)

(52) U.S. Cl.
CPC ..... *H04N 21/4312* (2013.01); *H04N 21/4316* (2013.01); *H04N 21/4402* (2013.01); *H04N 21/440236* (2013.01); *H04N 21/47217* (2013.01); *H04N 21/4884* (2013.01); *H04N 21/8547* (2013.01); *H04N 21/42224* (2013.01)

(58) Field of Classification Search
USPC .......................................................... 715/719
See application file for complete search history.

(56) References Cited

U.S. PATENT DOCUMENTS 6,646,655 B1 * 11/2003 Brandt .................. G09B 5/067 348/E5.014
7,856,602 B2 * 12/2010 Armstrong ............ G06F 3/0482 715/830
8,341,681 B2 * 12/2012 Walter ............... H04N 7/17318 725/74
8,712,219 B2 * 4/2014 Mustonen ......... H04M 1/72439 386/282
9,459,788 B2 * 10/2016 Kang .................. G06F 3/04883
9,665,170 B1 * 5/2017 Ross ...................... G06T 19/006
9,830,061 B1 * 11/2017 Wheeler ............. G06F 3/04842
9,959,086 B2 * 5/2018 Na ..................... H04N 21/4325
10,001,904 B1 * 6/2018 Geller ................... G06F 3/0482
10,162,489 B2 * 12/2018 Lee ....................... G06F 3/0481
10,192,119 B2 * 1/2019 Ljungberg ........... G11B 27/031
11,150,792 B2 * 10/2021 Han ........................ G06F 9/451
2002/0165721 A1 * 11/2002 Chang ..................... G10L 19/00 704/503
2004/0114475 A1 * 6/2004 Suzuki ................. G11B 27/105 369/30.08
2004/0169683 A1 * 9/2004 Chiu .................... G11B 27/105 715/776
2005/0146534 A1 * 7/2005 Fong .................... G11B 15/103
2005/0213942 A1 * 9/2005 Seo .................... H04N 21/4884 386/E9.013
2006/0109283 A1 * 5/2006 Shipman ............ H04N 21/4316 345/629
2006/0195480 A1 * 8/2006 Spiegelman ......... G11B 27/105
2007/0100787 A1 * 5/2007 Lim ................. H04N 21/41407
2007/0245243 A1 * 10/2007 Lanza ................ H04N 7/17318 715/205
2008/0062137 A1 * 3/2008 Brodersen .............. G11B 27/34 345/173
2008/0263590 A1 * 10/2008 Iki ...................... H04N 21/4325 348/E7.031
2009/0165737 A1 * 7/2009 Kreisig ................... F01L 1/047 123/193.5
2009/0265737 A1 * 10/2009 Issa ...................... G11B 27/105 725/38
2010/0122162 A1 * 5/2010 Terada .................. G06F 3/0485 345/589
2011/0163969 A1 * 7/2011 Anzures ................. G11B 27/34 345/173
2011/0200302 A1 * 8/2011 Hattori ................. H04N 13/156 386/290
2012/0144330 A1 * 6/2012 Flint ................... G06F 3/04847 715/765
2012/0173227 A1 * 7/2012 Ryu .................... G06F 16/5854 704/9
2012/0263433 A1 * 10/2012 Mei .................... G06Q 30/0276 386/E5.003
2012/0293712 A1 * 11/2012 Mountain ............ H04N 21/435 348/E7.001
2013/0070143 A1 * 3/2013 Jang ....................... H04N 23/61 348/333.05
2013/0081082 A1 * 3/2013 Riveiro Insua .. H04N 21/47205 725/38
2013/0239058 A1 * 9/2013 Yao ..................... G06F 3/04883 715/833
2013/0332830 A1 * 12/2013 Ciurdar ................. G06F 16/438 715/719
2014/0006951 A1 * 1/2014 Hunter ............... H04N 21/4821 715/719
2014/0047309 A1 * 2/2014 Kim ................. H04N 21/43072 715/203
2014/0215386 A1 * 7/2014 Song ................... G06F 3/04855 715/787
2014/0372888 A1 * 12/2014 Hoffert ............ H04N 21/42224 709/217
2015/0046941 A1 * 2/2015 Tanabe ................. H04N 21/812 725/32
2015/0067585 A1 * 3/2015 Won .................... G06F 3/04842 715/792
2015/0113407 A1 * 4/2015 Hoffert ................ H04N 21/482 715/720
2015/0193386 A1 * 7/2015 Wurtz ................... G06F 40/109 715/269
2015/0261418 A1 * 9/2015 Heo ...................... G06F 3/0485 345/661
2015/0347389 A1 * 12/2015 Lee ....................... G06F 40/242 704/2
2015/0370402 A1 * 12/2015 Checkley .............. G06F 3/0487 345/173
2016/0103830 A1 * 4/2016 Cheong ................. G06F 16/745 715/738
2017/0011264 A1 * 1/2017 Smolic ................... G11B 27/34
2017/0336955 A1 * 11/2017 Cho ................. H04N 21/41407
2018/0322346 A1 * 11/2018 Davies ................... G06V 20/46
2020/0320121 A1 * 10/2020 Beers .................. G06F 3/04847

FOREIGN PATENT DOCUMENTS

| | | | |
|---|---|---|---|
| KR | 10-2009-0043047 | A | 5/2009 |
| KR | 10-2011-0129087 | A | 12/2011 |
| KR | 10-2011-0132066 | A | 12/2011 |
| KR | 10-2013-0037420 | A | 4/2013 |
| KR | 10-1267872 | B1 | 5/2013 |
| KR | 10-1299778 | A | 8/2013 |
| KR | 10-2014-0021197 | A | 2/2014 |
| KR | 10-2014-0098905 | A | 8/2014 |
| KR | 10-2014-0129494 | A | 11/2014 |
| KR | 10-2014-0141408 | A | 12/2014 |
| KR | 10-2319456 | B1 | 10/2021 |
| WO | 2014-193161 | A1 | 12/2014 |

OTHER PUBLICATIONS

KR Office Action in Application No. 10-2014-0180219 dated Jan. 6, 2021.
International Search Report in Application No. PCT/KR2015/013773 dated Jun. 29, 2016.

(56) References Cited

OTHER PUBLICATIONS

Written Opinion in Application No. PCT/KR2015/013773 dated Jun. 29, 2016.
U.S. Office Action in U.S. Appl. No. 15/536,639 dated Oct. 2, 2019.
U.S. Notice of Allowance in U.S. Appl. No. 15/536,639 dated Feb. 3, 2020.
Korean Office Action dated Mar. 2, 2022 as received in application No. 10-2021-0142611.
Korean Office Action dated Apr. 3, 2023 as received in application No. 10-2023-0001199.

* cited by examiner

FIG. 4

[HEADER]
Title: Tour guide for Seoul
ScriptVersion: v1.00
FontFormat:
Fontname(Arial), Fontsize(20), Fontcolor(Black), Backcolor(White), Bold(True), Italic(False), Shadow(7)
File: MyClip.avi

[Events]
0:00:05.65, 0:00:12.79 - The Seoul Metropolitan Government (SMG) plans to revamp its tourism programs to meet the needs of visitors from China, Japan and other countries. The city government said Wednesday it would develop more programs illustrating Korea's history, K-pop and fashion.

0:00:19.11, 0:00:41.83 - The SMG operates 41 programs for foreign visitors. But a recent survey showed that tourists differ from one country to another — certain tours that are popular among Chinese tourists are not favored by Japanese visitors. For example, Chinese visitors tend to visit the city in big groups and are interested in shopping and food, while many Japanese tourists come in smaller groups and are more inclined toward K-pop and Korean drama.

MARKED, 0:00:53.25, 0:01:22.51 - Most tourists from North America and Southeast Asia visited Korea to experience its traditional culture and festivals, the SMG said. The city government said an increasing number of tourists wanted to learn more about Korea by visiting places such as its history museum of modern architecture.
Firstly, city administrators will develop specific programs based on culture and arts, industries and shopping, towns and alleys, nature and the environment and theme tours. The SMG plans to add some of the city's significant sites, including the Seoul Anglican Cathedral, Seoul City Wall and Ihwa Mural Village, to its programs. More marketing is also in the pipeline. "We will be more active in promoting the city via local media," an SMG official said.

0:01:31.16, 0:01:39.77 - In 2013, about 10.04 million foreign visitors — a record — travelled to Seoul, up 9.3 percent on 2012. Chinese made up the largest group. Over the years, visitor sightseeing preferences have changed. While spots such as Namdaemun and Dongdaemun saw a drop in visitors, new tourist locations, including areas of Hongdae, Samcheong-dong and Cheong Wa Dae, have gained popularity.

METHOD FOR GENERATING AND REPRODUCING MULTIMEDIA CONTENT, ELECTRONIC DEVICE FOR PERFORMING SAME, AND RECORDING MEDIUM IN WHICH PROGRAM FOR EXECUTING SAME IS RECORDED

TECHNICAL FIELD

The present invention relates to a method for generating and reproducing multimedia content, an electronic device for performing the same, and a recording medium having a program for executing the same stored therein, and more particularly, to a method for generating and reproducing multimedia content reproduced in a video manner or a slideshow manner, an electronic device for performing the same, and a recording medium having a program for executing the same stored therein.

BACKGROUND ART

These days, along with the development of communication technology and video processing technology, multimedia content is routinely utilized. Together with this tendency, there are frequent requests for an intelligent user interface that enables viewers of a variety of multimedia content to select desired scenes from the multimedia content and immediately view the scenes.

Users want to exclude advertisements in multimedia content, portions that have already been viewed, or portions that are not of interest and want to begin watching the multimedia content from a desired time point. However, when an analog apparatus such as a conventional video tape is used, random access to a desired point thereof is physically impossible. Thus, a user should directly check and access the desired portion by using a fast forward function. Recently, due to digital technology for multimedia content, it has become possible to immediately access a desired reproduction point with high accuracy.

However, fast forward (FF) and fast rewind (FR) functions used for high-speed search of digital content require many user inputs in order to move to an accurate position desired by a user. Also, a user must pay attention to the reproduction of media in order to check whether movement is made to a precise desired position. Also, a pre-existing search method is not appropriate when a user wants to quickly watch only key scenes by skipping to them.

DETAILED DESCRIPTION OF THE INVENTION

Technical Problem

An object of the present invention is to provide a content reproduction method capable of selecting key scenes of content reproduced as a video and reproducing the selected key scenes as a slideshow, and an electronic device for performing the same.

An object of the present invention is to provide A method for displaying multimedia content capable of providing multimedia content that can be selectively reproduced according to any one of a video mode and a slideshow mode in conjunction with text for the multimedia content such as a subtitle or an article, an electronic device for performing the same, and a recording medium having a program for executing the same stored therein.

Another object of the present invention is to provide a multimedia content generation method capable of capturing a video with a camera in real time or reading a video prestored in a memory and generating multimedia content that can reproduce the video as it is or reproduce key scenes of the video in a slideshow manner, an electronic device for performing the same, and a recording medium having a program for executing the same stored therein.

Another object of the present invention is to provide A method for displaying multimedia content capable of providing summary information of text so that a user may easily understand all details of the text and directly view a desired text section, an electronic device for performing the same, and a recording medium having a program for executing the same stored therein.

The objects of the present invention are not limited to the aforementioned objects, and other objects which are not described herein should be clearly understood by those skilled in the art from the following detailed description and the accompanying drawings.

Technical Solution

According to an aspect of the present invention, there is provided A method for displaying multimedia content including acquiring multimedia content including image data; acquiring event information regarding event time points matched on a timeline of the content; reproducing the content in any one reproduction mode between a video mode, in which the content is reproduced as a video, and a slideshow mode, in which key scenes of the content are sequentially displayed as still images, wherein the key scenes are images corresponding to the event time points; switching the reproduction mode to the slideshow mode when a first input having a first type is received while the video mode being is performed, wherein when the slideshow mode is entered from the video mode, the playback time point is set as a first event time point close to a playback time point on the timeline at which the first input is received, and a key scene corresponding to the first event time point is displayed; and maintaining the reproduction mode as the slideshow mode and shifting the playback time point when a second input having the first type is received while the slideshow mode is being performed, wherein the playback time point is shifted to a second event time point close to a playback time point on the timeline at which the second input is received, and a key scene corresponding to the second event time point is displayed.

According to an aspect of the present invention, there is provided a method for generating multimedia content that is output in a video mode and a slideshow mode, the method including acquiring video content; reproducing the video content in real time; receiving a scene selection input from a user while the video content is being reproduced; generating an event time point in a reproduction section of the video content on the basis of the scene selection input; acquiring a key scene from the video content on the basis of the event time point; and generating multimedia content by matching the key scene with the event time point of the video content.

According to another aspect of the present invention, there is provided an electronic device for generating multimedia content that is output in a video mode and a slideshow mode, the electronic device including a display configured to output an image; an input unit configured to receive an input from a user; and a control unit configured to acquire video content, reproduce the video content through the display in real time, receive a scene selection input from a user through the input unit while the video content is being reproduced, generate an event time point in a reproduction section of the video content on the basis of the scene selection input, acquire a key scene from the video content on the basis of the event time point, and generate multimedia content by matching the key scene with the event time point of the video content.

According to still another of the present invention, there is provided a recording medium having a program for executing the above-described multimedia content generation method stored therein.

The technical solutions of the present invention are not limited to the aforementioned solutions, and other technical solutions which are not described herein should be clearly understood by those skilled in the art from the following detailed description and the accompanying drawings.

According to an embodiment of the present invention, there is provided A method for displaying multimedia content including acquiring multimedia content including video data which is reproduced as a video, and slide data including a key scene, wherein a key scene is matched with an event time point in a reproduction time period of the video data and is displayed in a slideshow manner; acquiring a text data corresponding to the multimedia content; displaying the multimedia content in a first area according to a video mode for reproducing the video data as the video or a slideshow mode for displaying the key scene in the slideshow manner; displaying at least a portion of the text data in a second area; and adjusting the displayed text data according to the displayed multimedia content.

According to another aspect of the present invention, there is provided an electronic device including a display displaying an image; and a controller configured to acquire multimedia content including video data which is reproduced as a video, and slide data including a key scene, wherein a key scene is matched with an event time point in a reproduction time period of the video data and is displayed in a slideshow manner, acquire a text data corresponding to the multimedia content, display the multimedia content in a first area according to a video mode for reproducing the video data as the video or a slideshow mode for displaying the key scene in the slideshow manner, display at least a portion of the text data in a second area; and adjusting the displayed text data according to the displayed multimedia content.

According to still another of the present invention, there is provided a computer-readable recording medium having a program for executing the above-described multimedia content display method stored therein.

The technical solutions of the present invention are not limited to the aforementioned solutions, and other technical solutions which are not described herein should be clearly understood by those skilled in the art from the following detailed description and the accompanying drawings.

Advantageous Effects of the Invention

According to the present invention, by providing a slideshow manner in which key scenes are sequentially shown as still images as well as reproducing content capable of being reproduced as a video, it is possible to quickly enjoy all of the content mainly with the key scenes.

According to the present invention, it is possible to generate multimedia content capable of being produced in a slideshow mode as well as a video mode from a video.

According to the present invention, it is possible to generate multimedia content capable of being reproduced as a video captured with a camera in real-time or a video prestored in a memory or produced as key scenes of the video in a slideshow manner.

The advantages of the present invention are not limited to the aforementioned advantages, and other advantageous effects which are not described herein should be clearly understood by those skilled in the art from the following detailed description and the accompanying drawings.

DESCRIPTION OF THE DRAWINGS

FIG. 4 is a diagram showing details of comment data according to an embodiment of the present invention.

BEST MODE

Figure 1:
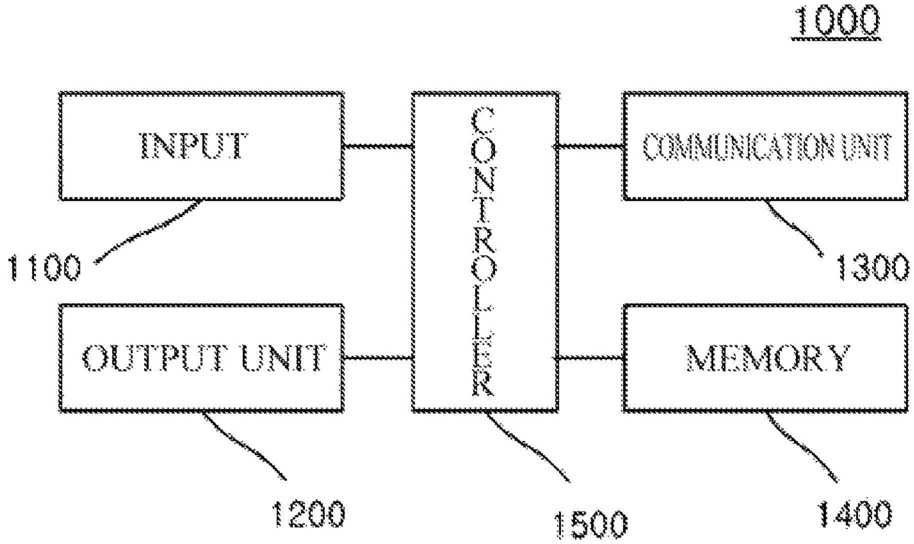
FIG. 1 is a block diagram of an electronic device according to an embodiment of the present invention.

Embodiments described in this specification are made to clearly explain the scope of the invention to those having ordinary skill in the art and are not intended to limit the present invention. It should be interpreted that the present invention may include substitutions and modifications within the technical scope of the present invention.

Terms used herein have been selected as general terms which are widely used at the present in consideration of the functions of the present invention, but may be altered according to the intent of an operator of ordinary skill in the art, conventional practice, or the introduction of new technology. However, when a specified term is defined and used in an arbitrary sense, a meaning of the term will be described separately. Accordingly, the terms used herein are not to be defined as simple names of the components, but should be defined based on the actual meaning of the terms and the whole context throughout the present specification.

The accompanying drawings are for facilitating the explanation of the present invention and a shape in the drawings may be exaggerated for the purpose of convenience of explanation, thus the present invention is not to be limited to the drawings.

In addition, details of generally known functions and structures which obscure the subject matter of the present invention will be omitted.

According to an embodiment of the present invention, there is provided A method for displaying multimedia content including acquiring multimedia content including video data which is reproduced as a video, and slide data including a key scene, wherein a key scene is matched with an event time point in a reproduction time period of the video data and is displayed in a slideshow manner; acquiring a text data corresponding to the multimedia content; displaying the multimedia content in a first area according to a video mode for reproducing the video data as the video or a slideshow mode for displaying the key scene in the slideshow manner; displaying at least a portion of the text data in a second area; and adjusting the displayed text data according to the displayed multimedia content.

Also, the adjusting may include refreshing the displayed text data.

Also, the adjusting may include performing an operation including at least one of a scrolling, a up-and-down moving of the text, a up-and-down shifting of the page, and a page turning on the displayed text data.

Also, the text data may include a text section linked to the event time points, and the adjusting may include displaying a text section linked to the event time point corresponding to a playback time point of the video data reproduced in the video mode in the second area.

Also, the text section may include at least one paragraph unit.

Also, the event time point corresponding to the playback time point may include at least one of the event time point identical to the playback time point in a reproduction section and the event time point positioned directly before the playback time point.

Also, the method for displaying multimedia content may further include a user input from a user indicating at least one of a scrolling, a up-and-down moving of the text, a up-and-down shifting of the page, and a page turning on the displayed text data; performing an operation on the text data according to the user input; and shifting the playback time point of the video data to an event time point to which the text section displayed in the second area is linked according to the operation.

Also, the method for displaying multimedia content may further include pausing the reproduction of the video data when shifting the playback time point.

Also, the method for displaying multimedia content may further include receiving a user input from a user indicating at least one of a scrolling, a up-and-down moving of the text, a up-and-down shifting of the page, and a page turning be performed on the text data from a user while the multimedia content is being displayed in the video mode; performing an operation on the text data according to the user input; shifting the playback time point of the video data to an event time point to which the text section displayed in the second area is linked according to the operation; and displaying the key scene which is matched with the event time point linked to the text section displayed in the second area and switching from the video mode to the slideshow mode.

Also, the text data may include a text section linked to the key scene; and the adjusting comprises displaying a text section linked to a key scene displayed in the slideshow mode in the second area.

Also, the text section may include at least one paragraph unit.

Also, the method for displaying multimedia content may further include receiving a user input from a user indicating at least one of a scrolling, a up-and-down moving of the text, a up-and-down shifting of the page, and a page turning be performed on the displayed text data from a user; performing an operation on the text data according to the user input; and displaying the key scene linked to the text section displayed in the second area according to the operation.

Also, the text data may include a text section linked to the event time points and a summary information of a text section.

Also, the displaying of the text data may include displaying the text section linked to an event time point corresponding to one of a playback time point of the video data reproduced in the video mode and the key scene displayed in the slideshow mode; and displaying the summary information of the text sections except for the displayed text section.

Also, the displaying of the text data may include displaying the text section linked to an event time point corresponding to any one of a playback time point of the video data reproduced in the video mode and the key scene displayed in the slideshow mode; and displaying the summary information of the text sections except for the displayed text section.

Also, the method for displaying multimedia content may further include receiving a user input selecting the summary information; displaying the text section according to the selected summary information; and setting the playback time point of the video data in the video mode or determining the key scene displayed in the slideshow mode on the basis of an event time point to which the text section is linked.

Also, the method for displaying multimedia content may further include receiving a user input indicating the bookmark from a user while the multimedia content is being displayed in the slideshow mode; and bookmarking a key scene displayed when the user input is received.

According to another aspect of the present invention, there is provided an electronic device including a display displaying an image; and a controller configured to acquire multimedia content including video data which is reproduced as a video, and slide data including a key scene, wherein a key scene is matched with an event time point in a reproduction time period of the video data and is displayed in a slideshow manner, acquire a text data corresponding to the multimedia content, display the multimedia content in a first area according to a video mode for reproducing the video data as the video or a slideshow mode for displaying the key scene in the slideshow manner, display at least a portion of the text data in a second area; and adjusting the displayed text data according to the displayed multimedia content.

According to still another of the present invention, there is provided a computer-readable recording medium having a program for executing the above-described multimedia content display method stored therein.

<Electronic Device>

An electronic device 1000 according to the present invention may display multimedia content.

Here, multimedia content refers to content composed of video data reproduced as a video and slide data formed by collecting key scenes of the video data. As necessary, the multimedia content may refer to content that additionally includes a subtitle in the form of text or comment data in the form of an article with respect to the video data or the key scenes.

The electronic device 1000 according to the present invention may display the video data or slide data that has been described in a video manner or a slideshow manner and may also appropriately display the comment data as the multimedia content.

The electronic device 1000 according to an embodiment of the present invention will be described below with reference to FIG. 1.

FIG. 1 is a block diagram of the electronic device 1000 according to an embodiment of the present invention. Referring to FIG. 1, the electronic device 1000 according to an embodiment of the present invention may include an input unit 1100, an output unit 1200, a communication unit 1300, a memory 1400, and a controller 1500. The components of the electronic device 1000 will be sequentially described below.

The input unit 1100 may receive a user input from a user. The user input may include a key input, a touch input, a voice input, and various other inputs. As an example, the input unit 1100 for receiving such a user input is a comprehensive concept including a touch sensor for detecting a touch of a user, a microphone for receiving a voice signal, a camera for recognizing a gesture or the like through image recognition, a proximity sensor composed of an illumination sensor or infrared sensor for detecting an approach of a user, a motion sensor for recognizing a motion of a user through an acceleration sensor, a gyro sensor or the like, and various other input units for detecting or receiving various user inputs, as well as a typical key pad, a typical keyboard, and a typical mouse. Here, the touch sensor may be implemented as a resistive or capacitive touch sensor which detects a touch through a touch panel or a touch film attached to a display panel, an optical touch sensor which detects a touch in an optical manner, etc.

In addition, the input unit 1100 may be implemented in the form of an input interface (a USB port, a PS/2 port, etc.) which connects an external input device that receives the user input to the electronic device 1000 instead of an apparatus which autonomously detects the user input.

The output unit 1200 may output various kinds of information and provide the information to a user. The output unit 1200 is a comprehensive concept including a display for outputting an image, a speaker for outputting a sound, a haptic device for generating vibration, and various other output units. In addition, the output unit 1200 may be implemented in the form of a port-type output interface for connecting the above-described individual output units to the electronic device 1000.

Here, as an example, the display may display text, a still image, and a video. Moreover, the display is a broad concept of an image display device, including a liquid crystal display (LCD), a light emitting diode (LED) display, an organic light emitting diode (OLED) display, a flat panel display (FPD), a transparent display, a curved display, a flexible display, a three-dimensional (3D) display, a holographic display, a projector, and various other devices for performing an image output function. The display may be a touch display formed integrally with a touch sensor of the input unit 1100.

The communication unit 1300 may communicate with an external device. Thus, the electronic device 1000 may transmit or receive various kinds of information to or from the external device. Here, the communication, that is, the transmission or reception of data, may be performed in a wired or wireless manner. To this end, the communication unit

1300 may be configured as a wired communication module for accessing the Internet or the like through a local area network (LAN), a mobile communication module for accessing a mobile communication network via a mobile communication base station to transmit or receive data, a short-distance communication module using a wireless local area network (WLAN) communication method such as Wi-Fi or a wireless personal area network (WPAN) communication method such as Bluetooth and Zigbee, a satellite communication module using a Global Navigation Satellite System (GNSS) such as a Global Positioning System (GPS), or a combination thereof.

The memory 1400 may store various kinds of information. The memory 1400 may temporarily or semi-permanently store data. Examples of the memory 1400 may include a hard disk drive (HDD), a solid state drive (SSD), a flash memory, a read-only memory (ROM), a random access memory (RAM), etc. The memory 1400 may be built into or detachable from the electronic device 1000.

An operating system (OS) for driving the electronic device, various kinds of programs needed or used to drive the electronic device 1000 according to an embodiment of the present invention, such as an application program for reproducing multimedia content as a video or showing the multimedia content in a slideshow manner according to A method for displaying multimedia content, which will be described below, various kinds of data regarding the multimedia content, such as the video data, the slide data, and the comment data, to be referenced by these programs, and metadata to be linked to the multimedia content by an application program, such as bookmark information or the like, may be stored in the memory 1400.

The controller 1500 controls overall operation of the electronic device 1000. To this end, the controller 1500 may calculate and process various kinds of information and may control operation of the components of the electronic device 1000.

The controller 1500 may be implemented as a computer or the like with hardware, software, or a combination thereof. The controller 1500 may be implemented with hardware and provided in the form of an electronic circuit for processing an electrical signal to perform a control function, and may be implemented with software and provided in the form of a program for driving the hardware controller 1500.

In the following description, unless otherwise specified, the operation of the electronic device 1000 may be interpreted as being performed under the control of the controller 1500.

The above described electronic device 1000 may load and reproduce multimedia content.

Here, the multimedia content, which is content including, for example, video data encoded according to various kinds of MPEGs or various other video codecs and slide data including key scenes of a video, may refer to content capable of being reproduced in the video mode or the slideshow mode.

The electronic device 1000 may reproduce such multimedia content in two modes, that is, the video mode for reproducing multimedia content as a video and the slideshow mode for reproducing key scenes of a video as still images in a slideshow manner.

Also, when multimedia content is reproduced in the video mode or the slideshow mode, the electronic device 1000 may display a comment together with an image with reference to the comment data.

A method for generating and reproducing such multimedia content will be described in detail below.

<Date Structure of Multimedia Content>

A data structure of multimedia content according to an embodiment of the present invention will be described below first before a method for displaying the above-described multimedia content is described.

Figure 2:
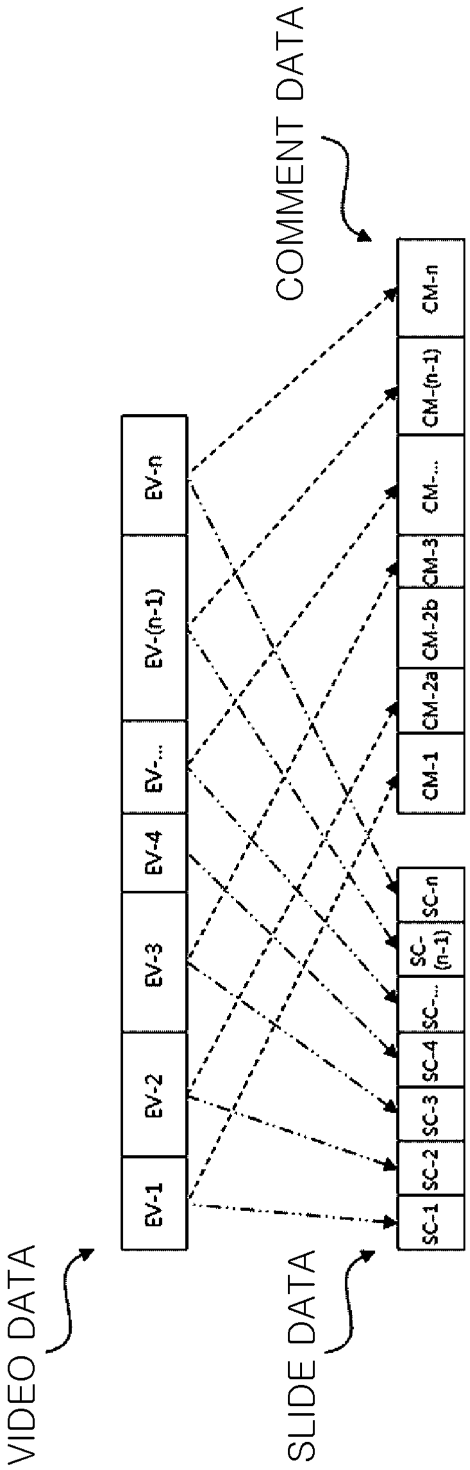
FIG. 2 is a schematic diagram of a data structure of multimedia content according to an embodiment of the present invention.

FIG. 2 is a schematic diagram of a data structure of multimedia content according to an embodiment of the present invention.

In the present invention, the multimedia content may include video data and slide data. Also, the multimedia content may additionally include the comment data. Here, the video data, the slide data, and the comment data may generally be present in the form of a single integrated file, but some data may be present in the form of a separate file as necessary. As a detailed example, the video data, the slide data, and the comment data may be present as a single file, or the video data and the slide data may be present as a single file while the comment data may be present as a separate file. It should be appreciated that file formats other than the above example are possible.

The video data of the multimedia content may be formed as well-known general video data. For example, the video data may be data regarding a plurality of image frames that are encoded to implement a video by sequentially outputting images according to MPEG, H.264, or any one of various other video codecs. When the codec is decoded in the video mode by the electronic device 1000, the video data may be reproduced as a video through a display-type output unit 1200.

Also, the slide data of the multimedia content may be configured as a set of key scenes corresponding to still images of a video at specified time points. Here, an entire reproduction section of the video data according to the present invention may be classified into a plurality of event sections EV-1, EV-2, EV-3, EV-4, . . . , EV-(n−1), EV-n, and the key scenes may refer to still images SC-1, SC-2, SC-3, SC-4, . . . , SC-(n−1), SC-n representing the event sections. In the slideshow mode, the slide data may be sequentially displayed in a slideshow manner by the electronic device 1000.

Also, the comment data of the multimedia content may refer to comment corresponding to the above-described event sections. Here, the comments may be mainly provided in the form of text. The comments may correspond to the event sections on a one-to-one basis. However, for some of the event sections, no comment may correspond to the event section, or a plurality of comments may correspond to the event sections. Referring to FIG. 2, it can be seen that two comments CM-2*a* and CM-2*b* correspond to the second event section EV-2 and no comment corresponds to the fourth event section EV-4. The comment data may be displayed in the form of a subtitle in the video mode or may be displayed in the form of a slide annotation in the slideshow mode. Alternatively, unlike this, the comment data may be displayed in the form of an article in a region other than a region at which a video or a slide image is displayed in the video mode or the slideshow mode. In the case of displaying in the form of an article, an operation such as scrolling or page turning may be performed automatically to display an appropriate comment according to progress of a video or a slide show.

<Structure of Comment Data>

A detailed structure of such comment data will be described below with reference to FIGS. 3 and 4.

Figure 3:
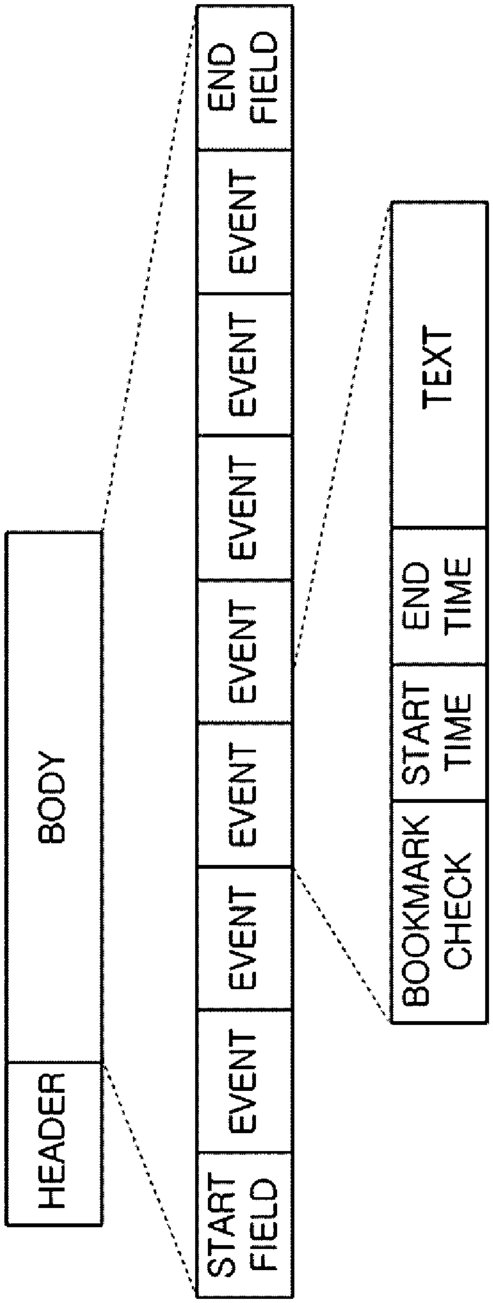
FIG. 3 is a schematic diagram of a structure of comment data according to an embodiment of the present invention.

FIG. 3 is a schematic diagram of a structure of comment data according to an embodiment of the present invention, and FIG. 4 is a diagram showing details of comment data according to an embodiment of the present invention.

The comment data may include a header and a body. Various kinds of information needed to output a comment or other additional information may be included in the header. Examples of the information needed to output a comment may include a font type, a size, a style, a color, a display position, or the like of text, and examples of the additional information may include a comment title, comment generator information, a date of generation, or the like. In FIGS. 3 and 4, it can be seen that the various kinds of information needed to output the comment and the additional information are described between "[HEADER]" and "[EVENT]".

The body may be composed of a start field, an event field, and an end field. The start field and the end field indicate a start and an end of the event field, respectively, and information regarding text to be output while the multimedia content is being displayed and regarding an event section in which details of the text should be displayed may be contained in each event field. Here, the information regarding an event section may be defined by a start time point and an end time point of the event section. Here, an event time point may be defined as a specified time point between the start time point and the end time point of the event section. As an example, the event time point may be defined as the start time point of the event section or a time point a predetermined time after the start time point.

In detail, bookmark check information, event section information, and text information may be included in the event field.

First, the text information is associated with text to be displayed, and generally has the form of a character string. The event section information may refer to a time section at which the text is displayed. As an example, the event section information may include start time point information and end time point information of the event section as shown in FIGS. 3 and 4. In this case, the character string of the comment text may be displayed from the start time point to the end time point. Of course, if the time length of the event section is set at a predetermined time interval, the event section information may include only the start time information of a comment.

The bookmark check information is an identifier for checking whether a corresponding event section (or event time point) is bookmarked. For example, according to the comment data of FIG. 4, "The Seoul Metropolitan . . . (omission) . . . K-pop and fashion" is displayed as a comment from "0:00:05.65" to "0:00:12.79" in the entire reproduction section of the multimedia content. Also, it can be seen that "MARKED" indicating that an event section corresponding to a range from "0:0053.25" to "0:01:22.51" is bookmarked.

In some cases, the event field may have no text information, or the text information may have the form of blank without a character string contained therein. In this case, a corresponding event section may have no comment.

<Video Data and Slide Data>

A relationship between the video data and the slide data will be described below.

According to an embodiment, the slide data may be obtained from the video data in consideration of an event time point. The event time point may be obtained with reference to the comment data or may be separately designated by a user. The event time point information, which is information that serves as a link among the video data, the slide data, and the comment data, may be included in the data or stored in the form of a separate file. For convenience of description, however, it is assumed that the comment data includes the event time point information.

Here, the video data may be received from an external device or may be prestored in and loaded from the memory 1400. For example, the video data may be streamed or downloaded from an external multimedia server (not shown) or may be received by the electronic device 1000 from a camera (not shown) for capturing an image in real time. Alternatively, the electronic device 1000 may prestore video data in the memory 1400, and the controller 1500 may load the video data from the memory 1400. In some cases, the electronic device 1000 may edit or generate video content to be used to generate multimedia content from original video data by using a video editing tool or a video generating tool.

Similarly, the comment data may be downloaded from an external device, loaded from the memory 1400, or generated through a comment editing tool of the electronic device 1400.

Figure 5:
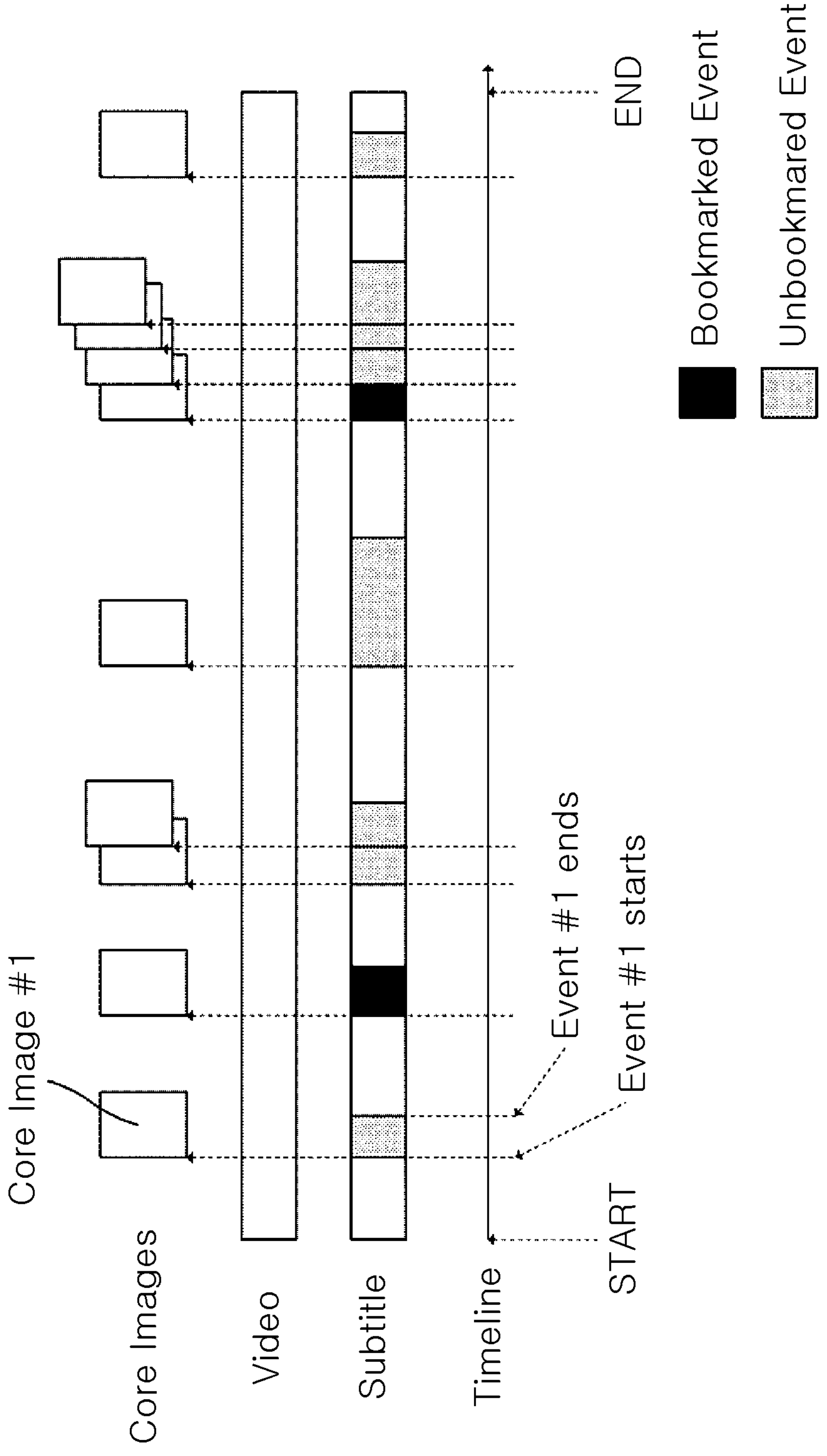
FIG. 5 is a diagram showing an example of selecting a key scene according to an embodiment of the present invention.

FIG. 5 is a diagram showing an example of selecting a key scene according to an embodiment of the present invention.

As an example, a still image at a time point corresponding to a start time point of an event section (hereinafter referred to as an "event time point") in a reproduction section of video data may be selected as a key scene, as shown in FIG. 5. The electronic device 1000 may read start time point information of the event section from the comment data and may select, as a key scene, a still image corresponding to the event time point in the reproduction section in which the video data is reproduced as a video.

The still image corresponding to the start time point of the event section has been described as being selected as the key scene, but there is no need to select the start time point as the key scene. For example, in some cases, the electronic device 1000 may select, as the key scene, a still image corresponding to a time point a predetermined time before or after the start time point of the event section or a still image corresponding to an end time point of the event section. In particular, when the comment data is generally utilized as a subtitle, the start time point of the event section may be set a little earlier or later than voice synchronization of a video corresponding to the subtitle. Accordingly, it may be effective to move a time point of a key scene a predetermined time up or back from the start time point of the event section.

Key scenes have been described as being selected corresponding to event sections on a one-to-one basis. Alternatively, the number of key scenes selected may be less than or greater than the number of event sections.

As an example, a single key scene may be selected for a plurality of event sections. For example, when the event sections are densely positioned in terms of time, that is, when comments are consecutively displayed for a short time, the electronic device 1000 may select a single key scene for the dense consecutive comments rather than a key scene for each of the event sections. Here, event sections being densely positioned in terms of time may refer to a case in which a plurality of event sections are within a predetermined time interval, a case in which a start time point of a previous event section is the same as an end time point of a current event section, or the like.

Figure 6:
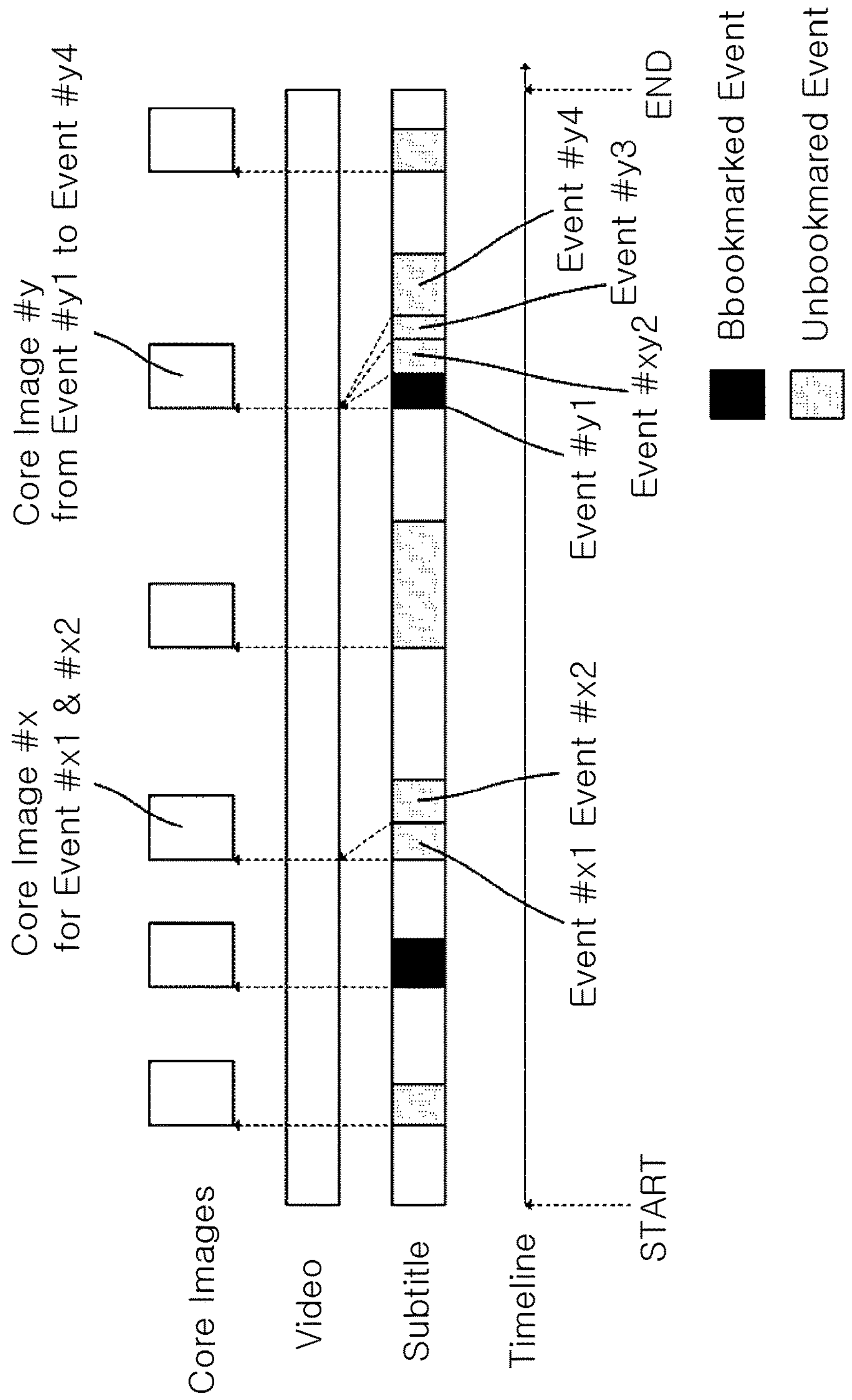
FIG. 6 is a diagram showing another example of selecting a key scene according to an embodiment of the present invention.

FIG. 6 is a diagram showing another example of selecting a key scene according to an embodiment of the present invention.

In FIG. 6, one key scene is shown as being selected for a plurality of event sections when the event sections are dense and present on a timeline of a reproduction section. In detail, a single key scene "#x" may be selected for event sections "#x1" and "#x2," and a single key scene "#y" may be selected for four event sections "#y1", "#y2", "#y3", and "#y4."

As another example, a plurality of key scenes may be selected for a single event section, unlike the above description in which the single key scene is selected for the plurality of event sections. For example, when a length of an event section, that is, an interval between a start time point and an end time point of the event section, is longer than a predetermined time interval, several key scenes may be selected for the event section. In this case, the key scenes may be selected in regards to start time points of a certain number of parts into which the entire length of the event sections is divided. Alternatively, the key scenes may be selected in regards to the start time points of the event section and time points a predetermined time after the start time points.

Figure 7:
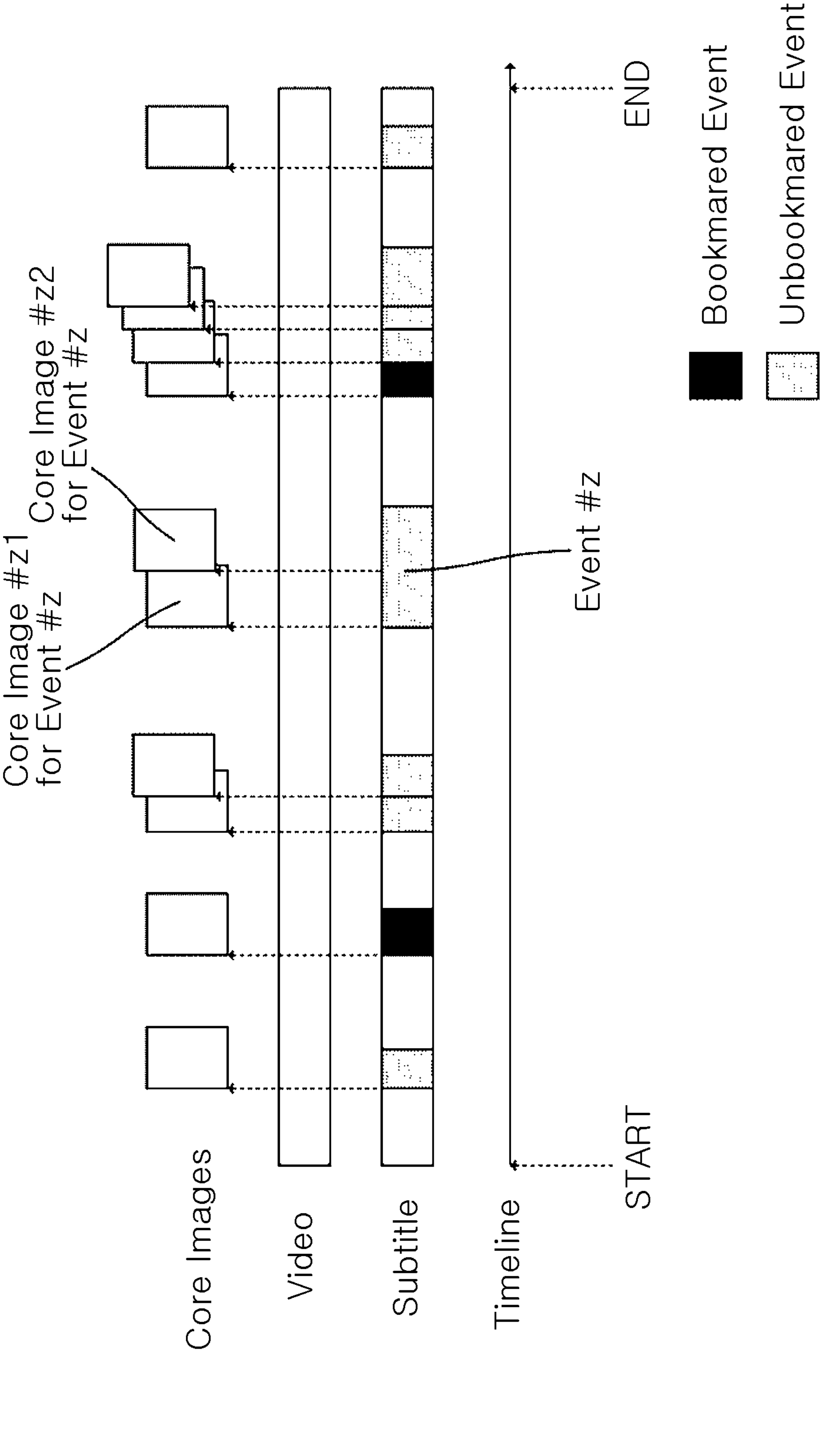
FIG. 7 is a diagram showing still another example of selecting a key scene according to an embodiment of the present invention.

FIG. 7 is a diagram showing still another example of selecting a key scene according to an embodiment of the present invention.

In FIG. 7, a key scene "#z1" is shown as being selected for a start time point of a long event section "#z" on a timeline, and a key scene "#z2" is shown as being selected for an intermediate point between a start time point and an end time point of the long event section "#z."

A key scene may be selected in consideration of a size of text information of an event section. For example, when a character string contained in text information of an event section has a certain length or more, several key scenes may be selected for the event section. For example, when a single key scene is selected for 30 characters, three key scenes may be selected for 80 characters of a character string included in a comment of an event section. Conversely, when there are a plurality of consecutive event sections each having a comment in which a character string contained in text information has a certain length or less, a single key scene may be selected for the consecutive event sections. For example, when five event sections each having a character string composed of four characters are consecutively arranged on a timeline, a single key scene may be selected for the five event sections.

The selected key scene may be extracted from a still image of video data displayed at an event time point. The key scene may be the same image as the still image of the video data or may be obtained by processing the still image of the video data.

When key scenes are acquired, the key scenes may be collected to generate the slide data. By default, the slide data may include event section information regarding a plurality of key scenes and an event section (or event time point) in a reproduction section of video data to which each of the key scenes is linked.

The slide data may have a dummy file structure that actually includes only the event section information without the still images of the key scenes. When such slide data is used, a core image may be extracted as a still image from video data that is reproduced in real time by simply using only the event section information.

When slide data is generated in this way, the electronic device 1000 may generate multimedia content by merging or interconnecting the video data and the slide data. In detail, the video data is data that is encoded to be reproduced as a video, and the slide data may include key scenes matching event time points (or event sections) which are specific time points in the reproduction section of the video. Additionally, the comment data may be merged or interconnected therewith. In this case, like the slide data, the comment data may include comments matching the event time points (or event sections) which are specific time points in the reproduction section of the video.

Such multimedia content may be selectively reproduced in the video mode or the slideshow mode, as will be described below.

<Multimedia Content Display Operation>

A display operation of multimedia content according to an embodiment of the present invention will be described below. For convenience of description, the above-described display operation will be described as being performed by the above-described electronic device 1000. Unless otherwise specified, it may be interpreted that operation of the electronic device 1000 is controlled by the controller 1500. It should be appreciated that the display operation is not limited by the above-described electronic device 1000 and may be performed using an electronic device that is similar to the above-described electronic device 1000.

<Slideshow Mode>

The slideshow mode in which key scenes selected as described above are sequentially shown as still images will be described below. The video mode is operated similarly to a method for generally reproducing a video through a well-known multimedia content player (e.g., Windows Media Player), and thus a detail description thereof will be omitted.

In the slideshow mode, key scenes may be sequentially displayed as still images in a slideshow manner. Here, the slideshow manner may refer to a method for outputting a specified key scene as a still image and then receiving a user input or automatically outputting a following or preceding key scene as a still image.

As described above, in the slideshow mode, a slide shifting function may be provided to sequentially output the key scenes.

Figure 8:
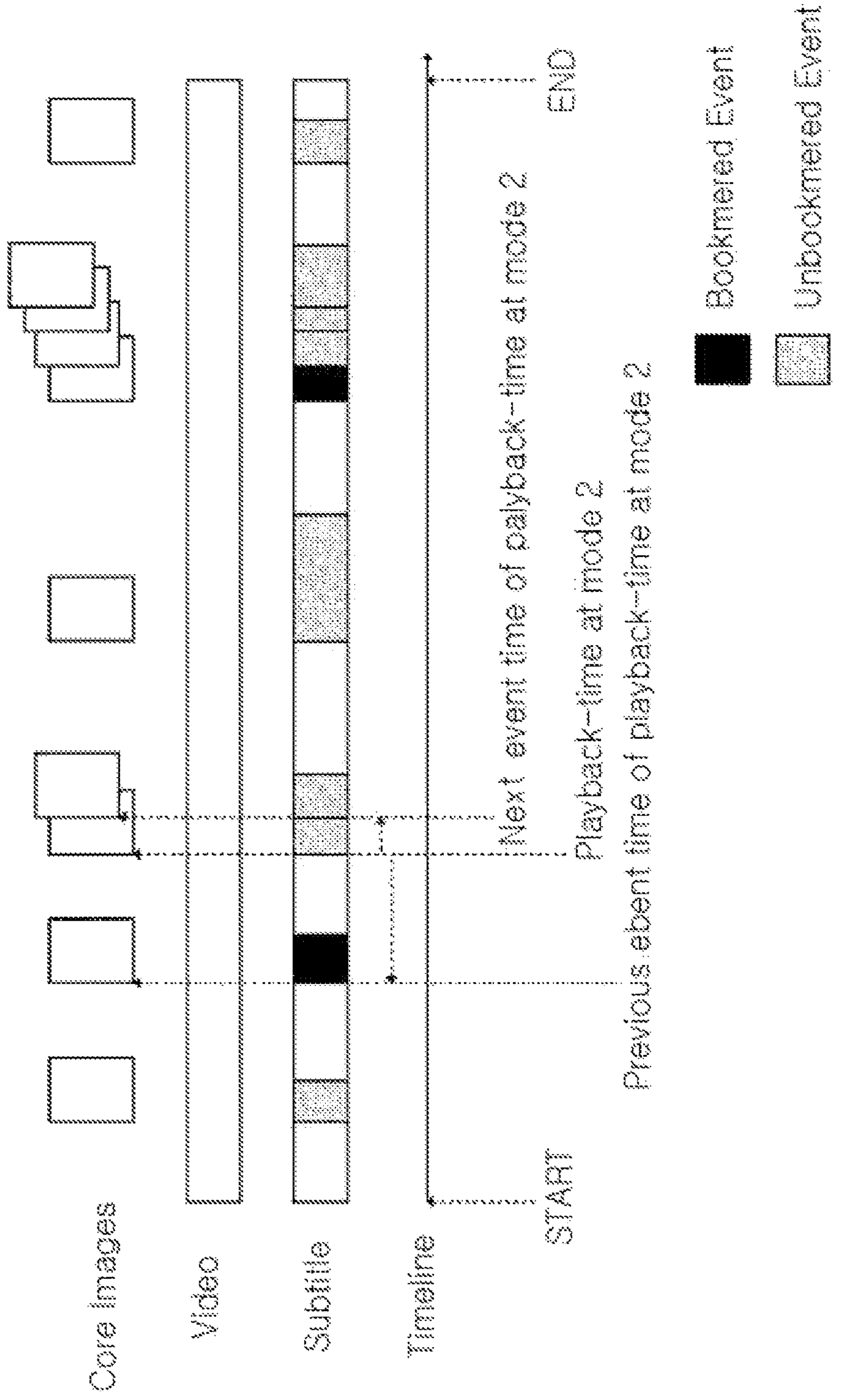
FIG. 8 is a diagram showing a slide shifting according to an embodiment of the present invention.

FIG. 8 is a diagram showing a slide shifting according to an embodiment of the present invention.

Here, a slide shifting refers to a change from a specific key scene, which is a still image, to the following or preceding key scene. Referring to FIG. 8, it is shown that in the slideshow mode, a slide shifting is performed from a specific key scene to the following or preceding key scene. In the slideshow mode, a shifting between key scenes may be performed with reference to the comment data. In detail, when an input for a slide shifting occurs, a slide shifting between key scenes may be performed on the basis of a current playback time point on a timeline corresponding to the input, for example, a start time point of a comment corresponding to a key scene, by searching the comment data for a comment corresponding to a time point on the timeline directly before or after the current playback time point and outputting a key scene corresponding to the found comment as a still image.

Also, when a still image is output in this way in the slideshow mode, comment text of a comment corresponding to a key scene may also be output. When a plurality of comments correspond to a single key scene and the key scene is output as a still image, text of the plurality of comments may be displayed on a single screen. Conversely, when a plurality of key scenes correspond to a single comment, the text of the comment may be divided and matched to each main scene.

As described above, when the slideshow mode is used, a user can identify details of corresponding content for a short time while viewing key scenes and comments without watching an entire video.

In the slideshow mode, instead of a sequential shifting among the key scenes a bookmark shifting function for a shifting only among scenes bookmarked from among key scenes may be provided.

Here, a bookmarked key scene may be a key scene that is selected corresponding to a comment bookmarked when a key scene is selected using the comment data.

Alternatively, in the slideshow mode, a bookmark may be set for a key scene. In detail, when a user input for bookmark setting occurs while a still image of a specific key scene is being output in the slideshow mode, the key scene may be set as a bookmarked key scene. When the user input for bookmark setting occurs as described above, information indicating that a comment corresponding to a still image being output is a bookmarked comment may be recorded in a comment bookmark check field.

Also, the bookmark setting may be performed at any time point during reproduction in the video mode. In detail, when the user input for bookmark setting occurs while content is being reproduced as a video, an image at a playback time point corresponding to the user input may be set as a bookmarked core image. When a bookmark is set at any time point as described above, a comment having a corresponding time point as a start time point is generated in comment data and recorded in the bookmark check field as a bookmarked comment. Such a comment has text information processed as a blank (a vacant comment) or has no text information.

When a bookmark is set, additional information regarding a bookmarked key scene may be generated in addition to the bookmarked key scene being set. For example, when the input for the bookmark setting is received from a user, the electronic device 1000 may provide a text input window to a screen thereof and then receive a character string from the user. In this case, the received character string may be stored as text information of a comment corresponding to a bookmarked key scene. Accordingly, when the bookmarked key scene is displayed later, the character string received from the user may additionally be displayed in the form of a subtitle.

Figure 10:
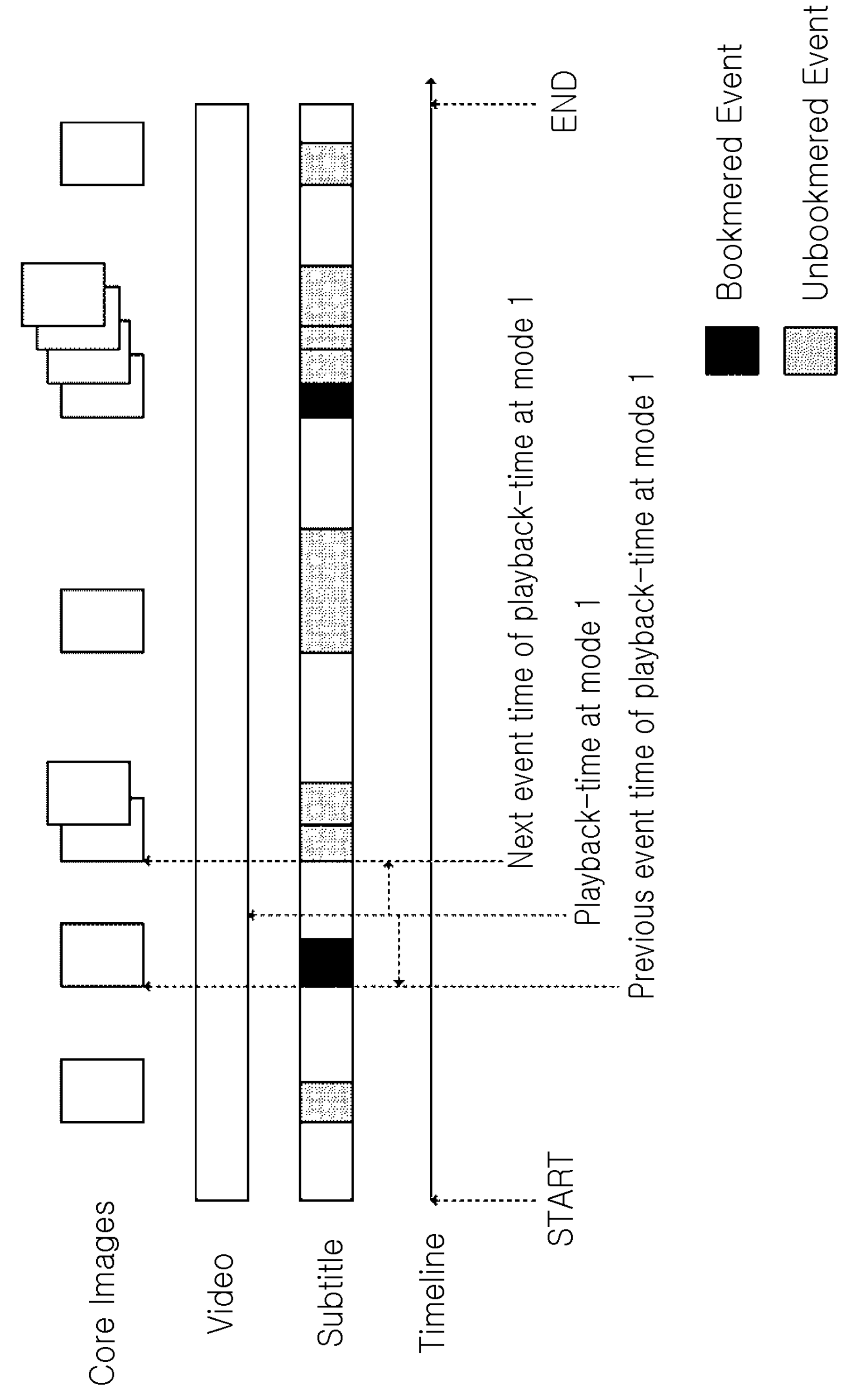
FIG. 10 is a diagram showing entry into a slideshow mode according to an embodiment of the present invention.

As described above, a shifting between bookmarks may be possible when the bookmark is set. FIG. 10 is a diagram showing a bookmark shifting according to an embodiment of the present invention. Referring to FIG. 10, when an input for shifting between bookmarked key scenes occurs, the shifting between the bookmarked key scenes may be performed on the basis of a current playback time point on a timeline corresponding to the input by searching the comment data for a bookmarked comment corresponding to a time point on the timeline directly before or after the current playback time point and outputting a key scene corresponding to the found bookmarked comment as a still image. Here, the search for the bookmarked comment may be performed by examining the comment bookmark check field.

<Entry into Slideshow Mode>

An operation of entering the above-described slideshow mode will be described below.

In order to reproduce multimedia content in the slideshow mode, the content may be reproduced in the slideshow mode from the beginning. In some cases, a reproduction mode of the content may be switched to the slide show mode while the content is being reproduced in the video mode.

When the content is reproduced in the slideshow mode from the beginning, the content is reproduced by reproducing several key scenes as still images through a slide shifting beginning with the first key scene on a timeline. However, when an input for a user requesting entry into the slideshow mode occurs while the content is being reproduced in the video mode, the reproduction mode thereof is changed to the slideshow manner.

When the video mode is switched to the slideshow mode in this way, the slideshow mode may be entered on the basis of a playback time point corresponding to the switching by outputting a key scene corresponding to a time point on the timeline directly before or after the playback time point as a still image.

Figure 9:
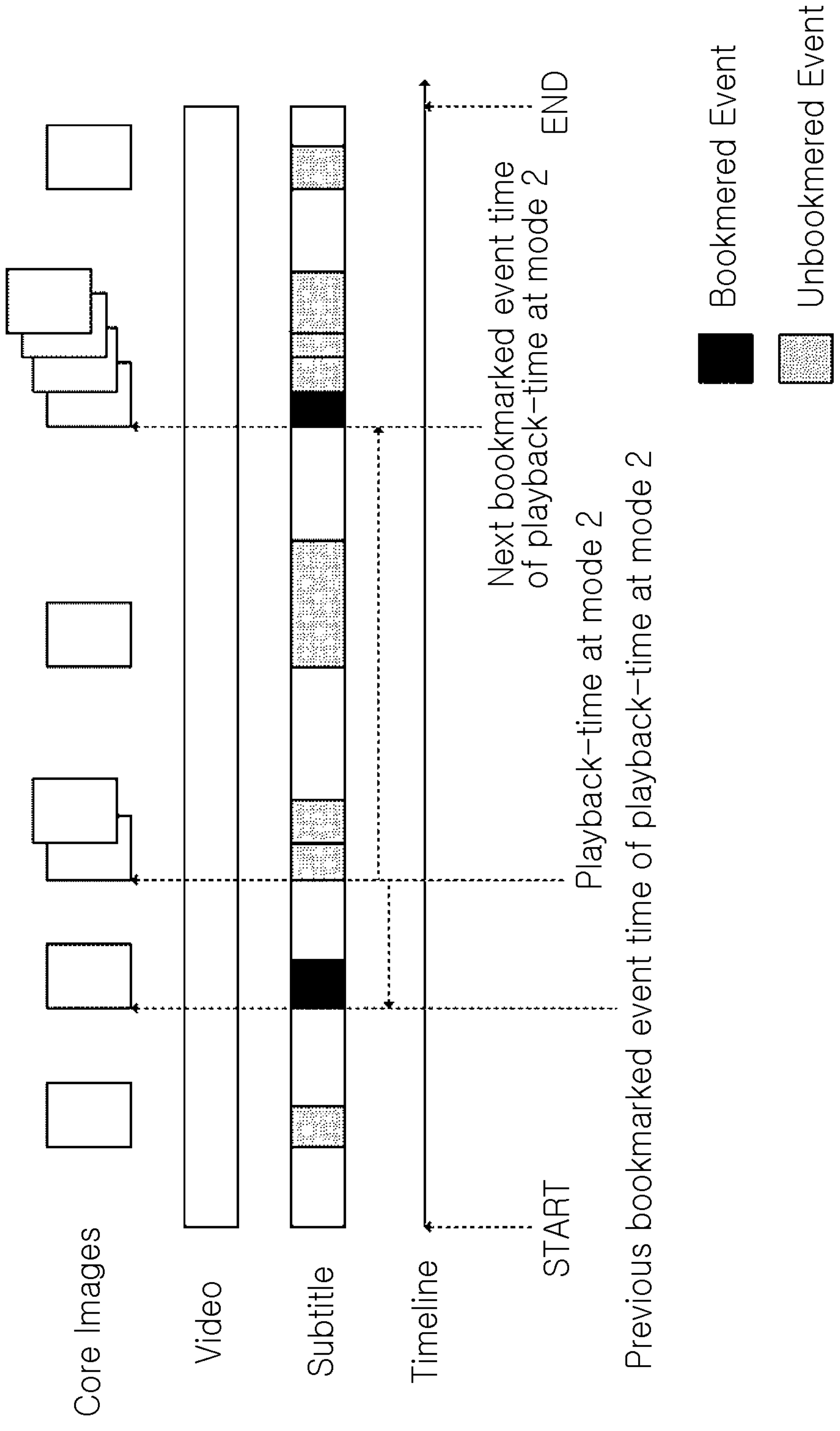
FIG. 9 is a diagram showing a bookmark shifting according to an embodiment of the present invention.

FIG. 9 is a diagram showing entry into the slideshow mode according to an embodiment of the present invention. Referring to FIG. 9, it can be seen that when the video mode is switched to the slideshow mode, a key scene corresponding to a time point on the timeline directly before or after a playback time point corresponding to the switching is reproduced as a still image.

<User Interface in Slideshow Mode>

Various kinds of user interfaces for performing an operation associated with the above-described slideshow mode will be described below.

A default screen for a multimedia content display operation will be described first before a user interface is described in detail. The default screen may be provided through the output unit 1200 of the electronic device 1000.

Figure 11:
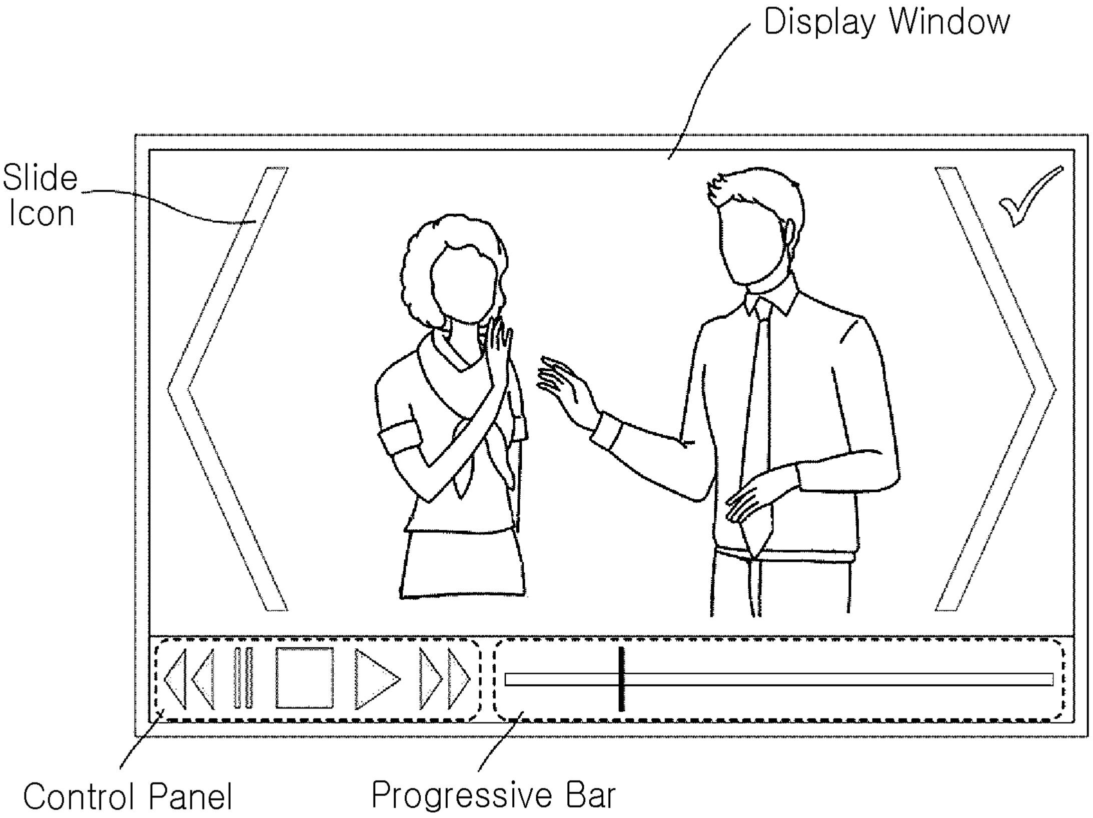
FIG. 11 is a diagram showing an example of a multimedia content display screen according to an embodiment of the present invention.

FIG. 11 is a diagram showing an example of a multimedia content display screen according to an embodiment of the present invention. Referring to FIG. 11, a display window, a progressive bar, a control panel, a slide icon, and a bookmark icon may be included in the default screen.

A key scene may be displayed in the display window as a still image. Also, in a portion of the display window, a subtitle region in which a comment is displayed may be positioned over the still image. Also, icons for various kinds of user inputs (for reproducing, stopping, pausing, rewinding, and fast-forwarding a video) which are used in the video mode may be arranged on the control panel. Also, a bar corresponding to a reproduction time period of an entire video and an icon indicating a current playback time point on the bar are positioned on the progressive bar.

The slide icon may be positioned on left and right sides of the display window. The slide icon is associated with a user input performing a slide shifting during the slideshow mode. Also, the bookmark icon is associated with a user input for bookmark setting.

Various kinds of functions may be performed in the multimedia content display operation through a user input or touch input for selecting an icon provided by the default screen.

First, the video mode may be switched to the slideshow mode as follows.

When a user input selecting a slide icon is received from a user while content is being reproduced in the video mode, the electronic device 1000 may change a reproduction mode of the content from the video mode to the slideshow mode. In detail, when a user input selecting a right slide icon is received, the slideshow mode is entered by displaying a key scene corresponding to a time point on a timeline directly after a playback time point corresponding to the reception in the video mode as a still image. When a user input selecting a left slide icon is received, the slideshow mode is entered by displaying a key scene corresponding to a time point on the timeline directly before a playback time point corresponding to the reception in the video mode as a still image.

Figure 12:
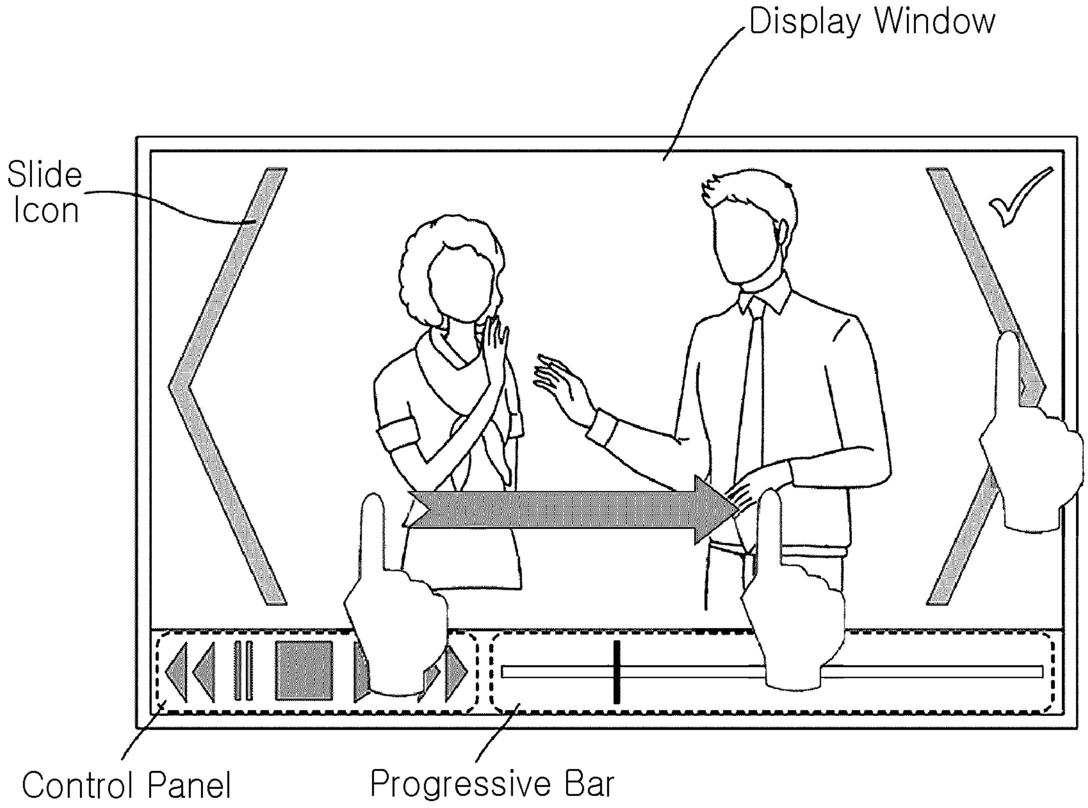
FIG. 12 is a diagram showing a request for entering a slideshow mode or an input for a slide shifting according to an embodiment of the present invention.

Alternatively, when a horizontal drag touch input is applied in the video mode, the electronic device 1000 may switch the reproduction mode to the slideshow mode. FIG. 12 is a diagram showing a user input for mode switching according to an embodiment of the present invention. A reproduction mode may be switched when a drag touch input is applied to a subtitle region. In detail, it may be determined that the drag touch input is applied to the subtitle region when a start time point of the touch input is within the subtitle region. Here, depending on a horizontal movement direction of the drag touch input, it may be determined whether to output a key scene before or after a playback time point of a video on a timeline as a still image when the slideshow mode is entered. For example, as shown in FIG. 12, when a direction of the touch input is rightward, a key scene after the playback time point on the timeline at which the touch input is received may be output. FIG. 12 also shows selection of a slide icon for a slide shifting, and thus the following description refers to FIG. 12.

When the video mode is entered from the slideshow mode as described above, the default screen may be partially changed. As an example, the slideshow mode may have different comment attributes from the video mode. Comment attributes may refer to a font size, a color, a font type, and a display position of a comment. As an example, when the slideshow mode is entered, a text font size may increase in comparison to the video mode.

It is also possible to change from the slideshow mode back to the video mode. In this case, a video may be reproduced immediately from a playback time point of a slideshow. Alternatively, the video may be reproduced from a time point a predetermined time interval before the playback time point of the slideshow. Thus, the video may be naturally reproduced.

In the slideshow mode, a slide shifting between key scenes may be performed in a manner similar to the mode switching. In other words, the slide shifting may be performed by the slide icon being selected or a horizontal drag touch being applied.

In the slideshow mode, a slide shifting between key scenes may generate a visual effect in which a screen is changed in a sliding way.

For example, when a drag touch input is received in the slideshow mode, a current key scene moves in a display window in a direction of the drag touch input, and a key scene to be displayed is output to an empty space caused by the slide shifting. In this case, the movement of the key scene is proportional to a length of the drag. In this case, when a movement distance of the key scene is greater than or equal a predetermined distance, that is, when an end of the current key scene exceeds a predetermined boundary, the slide shifting is performed. Conversely, when the drag touch input ends before the slide shifting is performed, the slide shifting may not be performed.

When the slide shifting is repeated, a final key scene among several key scenes may be output as a result. In this case, a user may be informed that the current key scene is the last key scene through the default screen. For example, when the final key scene is reached, the electronic device 1000 may omit a slide icon for shifting to a following key scene from the default screen. Conversely, a slide icon for shifting to a preceding key scene may not be displayed while the first key scene is being output.

Figure 22:
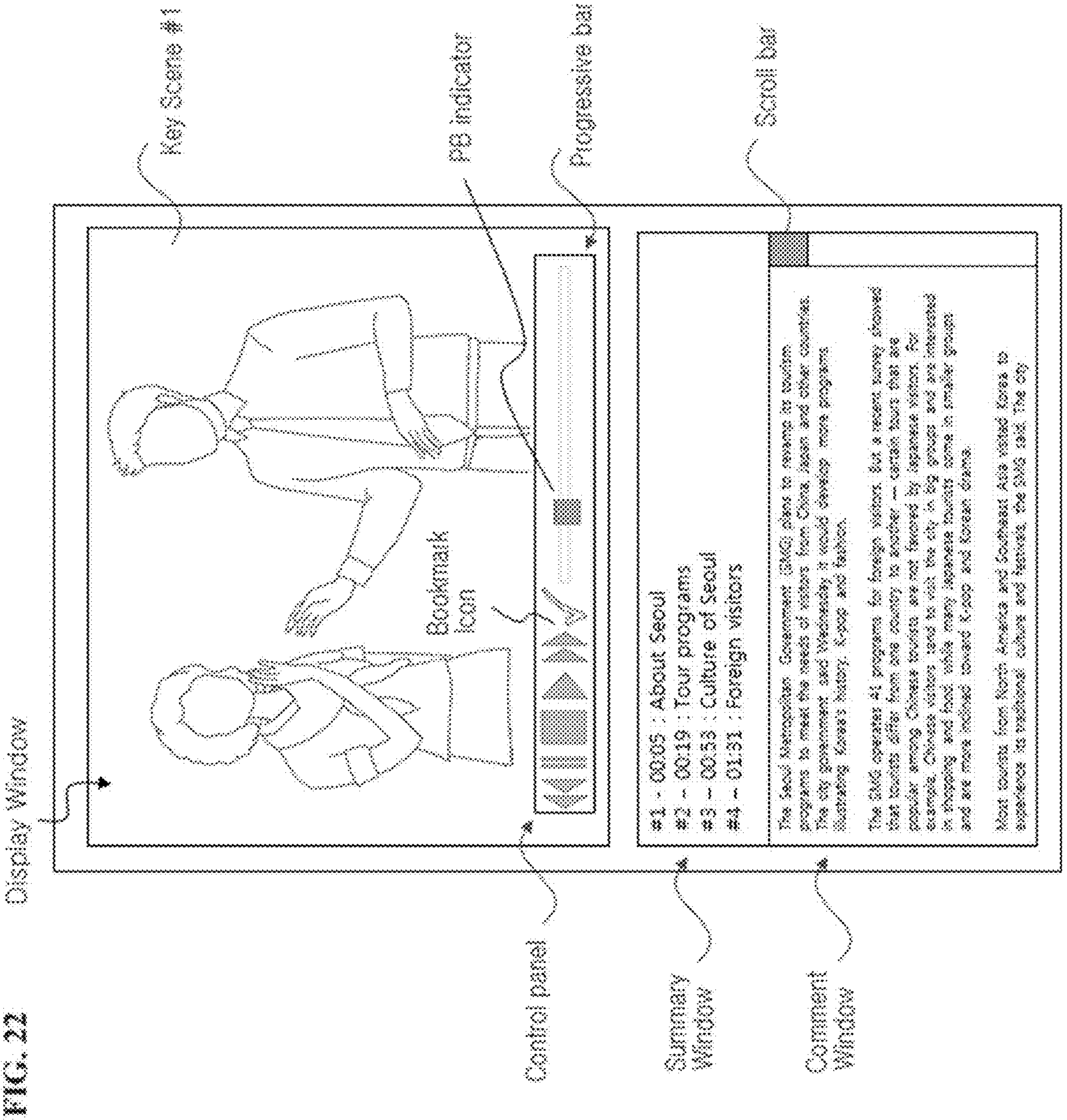
FIGS. 22 and 23 are diagrams showing examples of a multimedia content display screen provided together with a comment and summary information according to an embodiment of the present invention.

Next, the bookmark setting will be described. FIG. 22 is a diagram showing a bookmark setting in the slideshow mode according to an embodiment of the present invention. According to FIG. 22, when a user input selecting a bookmark icon of the default screen occurs, a bookmark may be set for a current playback time point in the video mode or the slideshow mode. When a bookmark is set in this way, a corresponding scene is set as a bookmarked key scene. Referring to FIG. 22, it can be seen that a bookmark is set for a comment for a corresponding key scene.

Also, when a bookmark is set in this way, a character input window for generating additional information may be provided. When a character string is input into the window by a user, text may be displayed together with a corresponding comment. The text that is input as the additional information may be displayed to have different comment attributes from original comments. When a bookmark is set for a position at which there is no comment, a dummy comment is generated.

Figure 13:
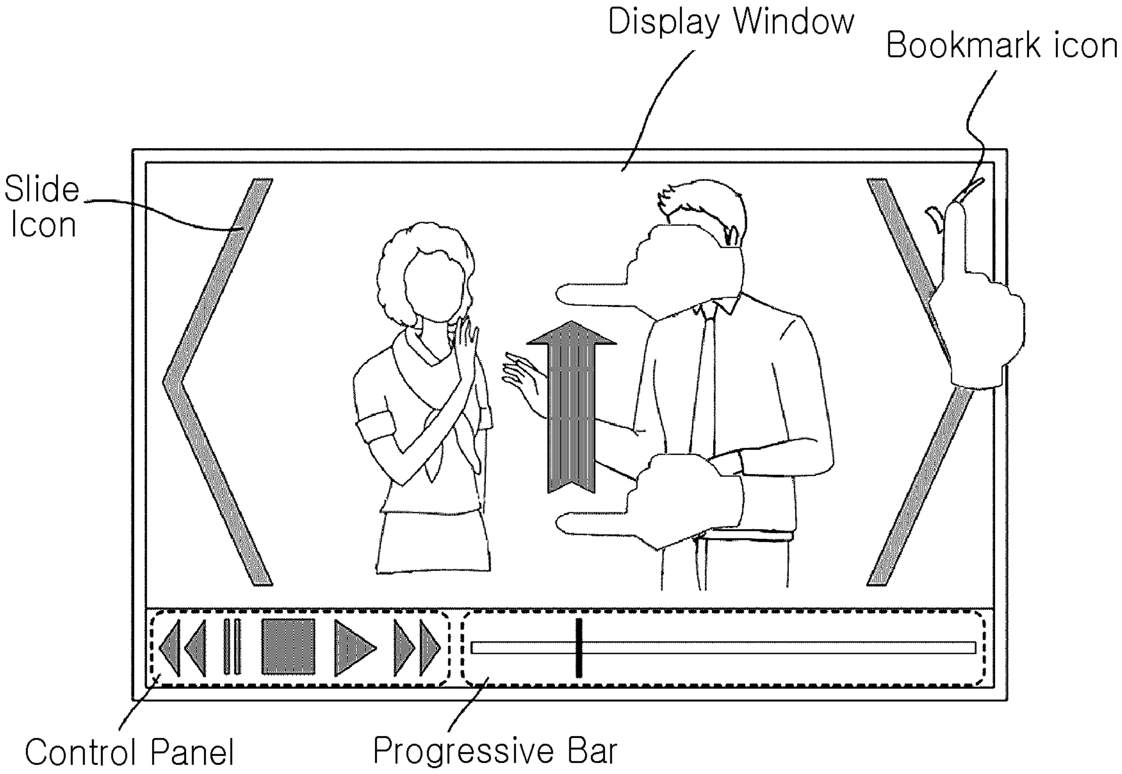
FIG. 13 is a diagram showing a bookmark setting input according to an embodiment of the present invention.

A bookmark shifting using a bookmark that is set in this way may be performed as follows. FIG. 13 is a diagram showing a bookmark setting input according to an embodiment of the present invention. A bookmark shifting may be performed according to a horizontal drag touch input. Here, the bookmark shifting may be performed when a drag touch input is applied to a subtitle region. However, such a drag touch input may refer to a movement of a predetermined distance or more in a horizontal direction. In other words, the above-described slide shifting and bookmark shifting may be distinguished depending on a drag distance. For example, when a drag is performed for less than the predetermined distance, the slide shifting may be performed. When the drag is maintained for more than the predetermined distance, the bookmark shifting may be performed. As in a case of the slide shifting, whether to shifting to a preceding or following bookmark may be set according to a drag direction.

Figure 14:
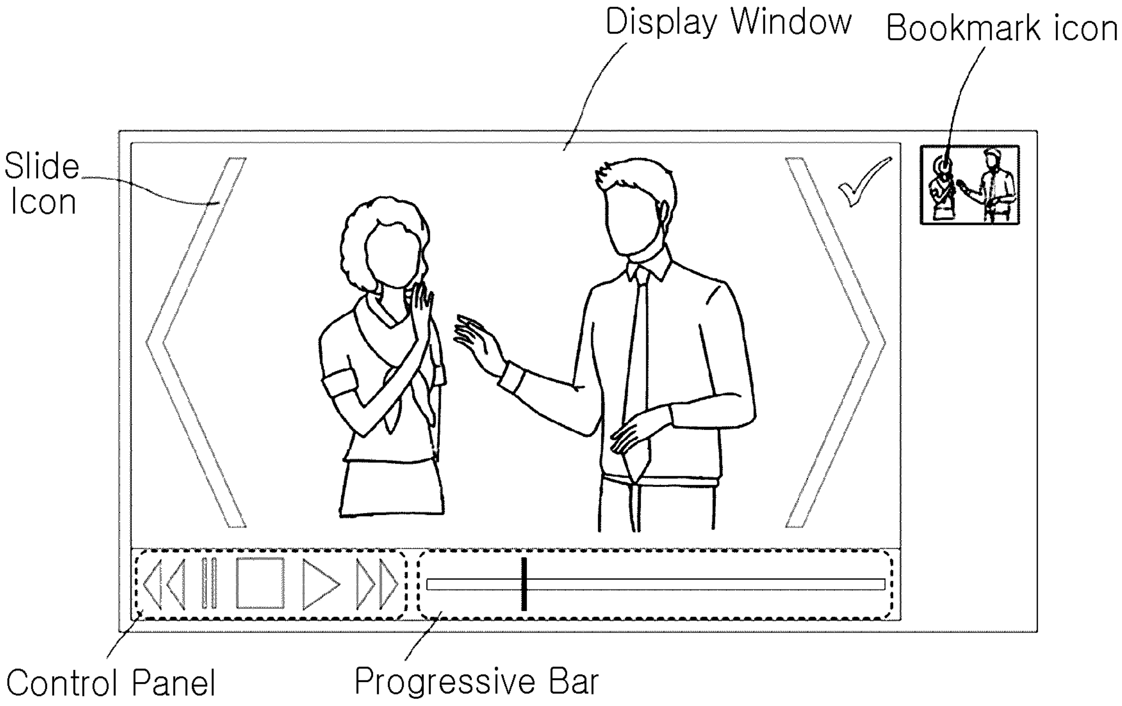
FIG. 14 is a diagram showing a bookmark indication according to an embodiment of the present invention.

The electronic device 1000 may display a list of bookmarked key scenes. FIG. 14 is a diagram showing a bookmark indication according to an embodiment of the present invention. Referring to FIG. 14, in the slideshow mode, images of bookmarked key scenes may be listed and displayed. For example, when a vertical drag touch input is applied (e.g., in a downward direction), the electronic device 1000 may move a display window down according to a degree of the drag, list bookmarked core images in chronological order, and display the listed core images in an empty space in which the display window was positioned.

In this situation, when an image is selected from among the listed images by a user, a playback time point may be shifted to a still image of the bookmarked core image, and the still image may be displayed.

When a horizontal drag touch occurs while the bookmarks are being displayed, the listing of the bookmarks may be released.

The above-described slideshow mode may be executed using content pre-stored in the memory 1400 of the electronic device 1000. However, in some cases, the slideshow mode may be executed while data regarding content is being received from an external device in a streaming manner. For example, the data regarding the content may be transmitted through the communication unit 1300 of the electronic device 1000 from an external device, and the electronic device 1000 may temporarily store the data regarding the content in a buffer and reproduce the content while reading the buffer.

Here, the electronic device 1000 may receive a still image of a key scene to be displayed in the slideshow mode first. Generally, in a video streaming service, video data for playing a video is sequentially received beginning with a playback time point. However, according to the present invention, a still image of a key scene may be transmitted earlier than the video data is received. The still image of the key scene has a much smaller size than a video. Accordingly, even when it is difficult to reproduce content as a video due to a low transmission rate, the electronic device 1000 may reproduce content in the slideshow mode by receiving a key scene first. To this end, the electronic device 1000 may receive the comment data first.

When still images of a key scene are acquired first as described above, the still images may be received in order from a still image closest to a current playback time point to smoothly play a slideshow.

<Comment Data Display Operation>

The video mode and the slideshow mode that use the video data and the slide data, respectively, have been described. However, the commend data may be additionally output in the video mode and the slideshow mode.

Figure 15:
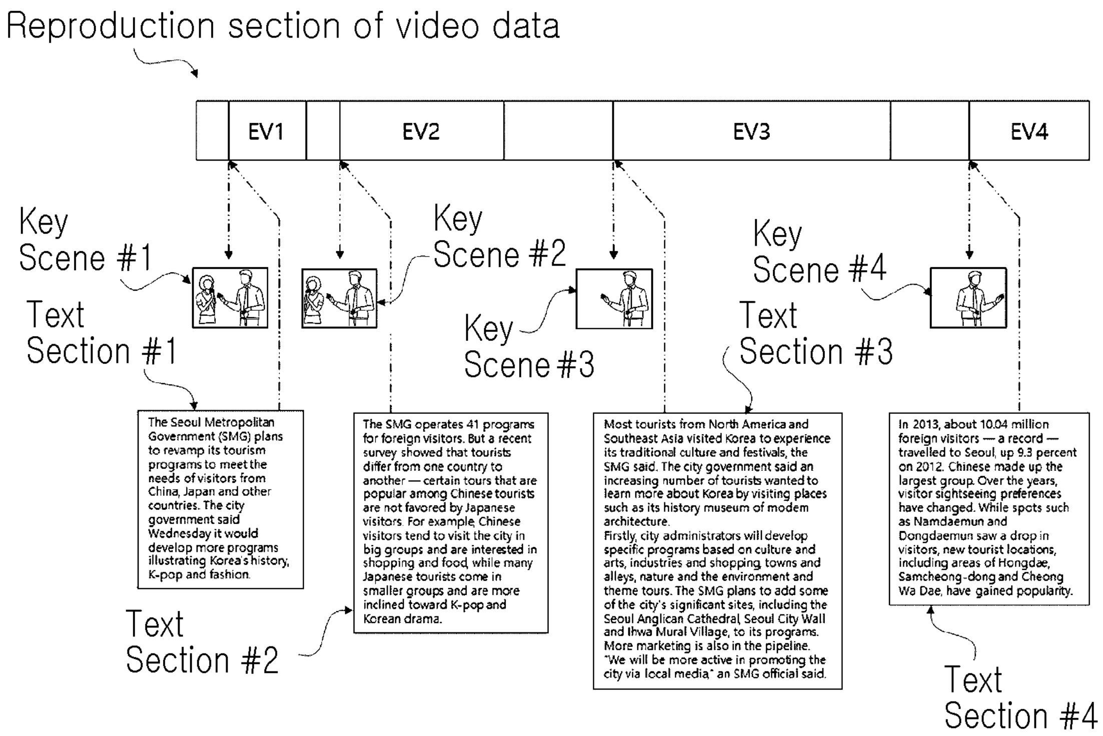
FIG. 15 is a diagram showing an example of a matching relationship among video data, a key scene, and comment data according to an embodiment of the present invention.

FIG. 15 is a diagram showing an example of a matching relationship among video data, a key scene, and comment data according to an embodiment of the present invention.

Referring to FIG. 15, as described above, the multimedia content may include video data having event sections, slide data including key scenes, and comment data having text sections in a reproduction section. Here, the event sections, the key scenes, and the text sections may be linked or matched to interwork with each other. Here, the event sections, the key scenes, and the text sections may interwork with each other through an event time point.

The linked information may be used to reproduce a video with reference to the video data and display text sections linked to an event section to which a playback time point belongs in the video mode or to display key scenes in a slideshow mode and display text sections linked to the key scenes in the slideshow manner.

<Display of Comment Data>

Figure 16:
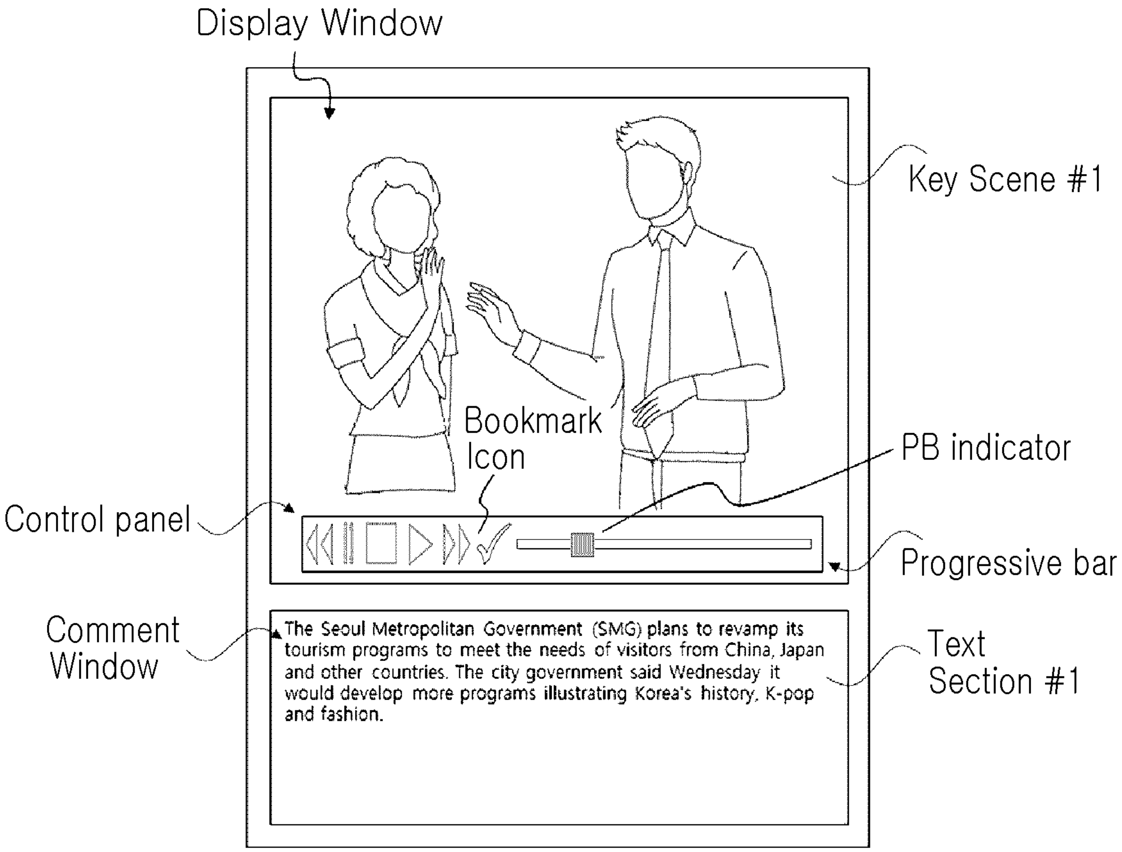
FIGS. 16 and 17 are diagrams showing examples of a multimedia content display screen provided together with a comment according to an embodiment of the present invention.
Figure 17:
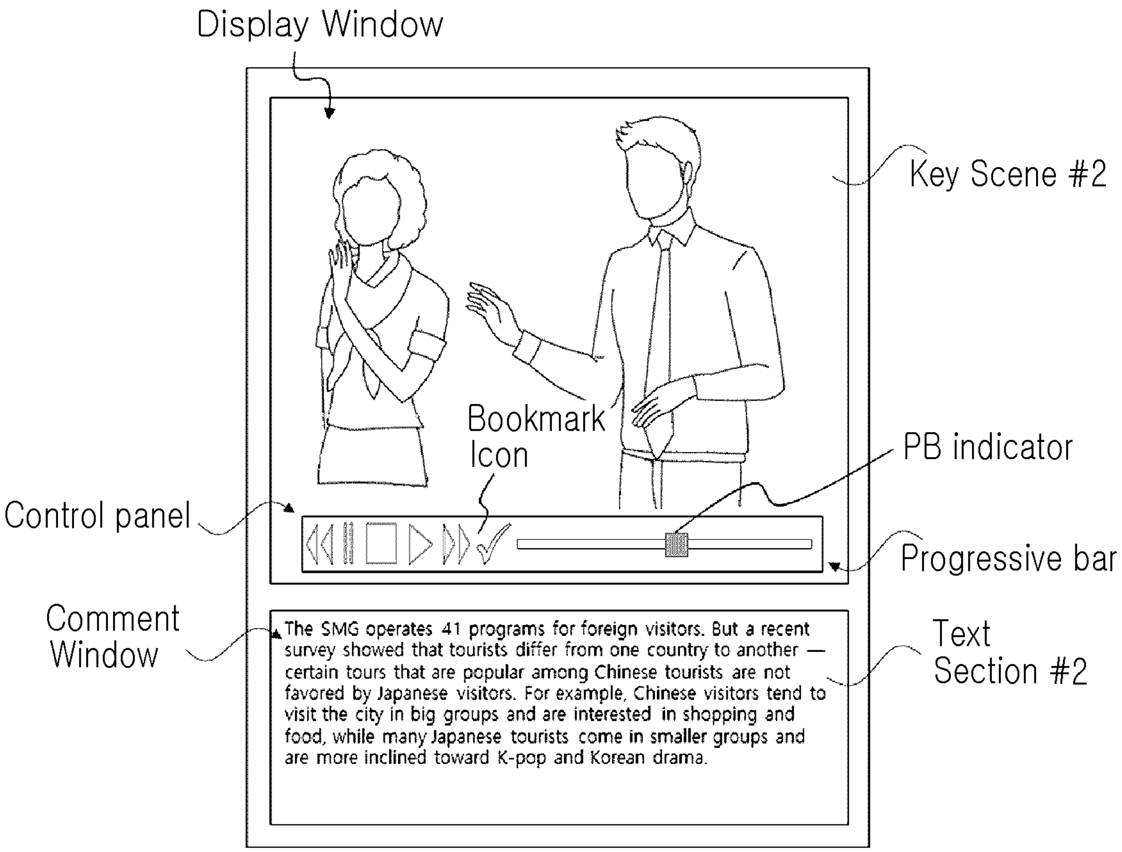

FIGS. 16 and 17 are diagrams showing examples of a multimedia content display screen provided together with a comment according to an embodiment of the present invention.

The comment data may be largely displayed in the form of a subtitle or an article. Generally, when the text data is displayed in the form of a subtitle, a comment window may be included in a display window in the form of a subtitle region, and text may be displayed in a form in which a video or a core image overlays the subtitle.

Conversely, the text data may be displayed in the form of an article. In this case, the display window, in which a video or a key scene is to be displayed on a screen, and the comment window, in which text sections are to be displayed, may be separately displayed.

Referring to FIG. 16, it can be seen that a key scene or the video data is displayed in the display window and a text section is displayed in the comment window. In FIG. 16, a first key scene is displayed in the display window, and a first text section linked thereto is displayed in the comment window. In addition, a control panel for performing a shifting between playback time points or key scenes, starting reproduction or stopping reproduction, a bookmark setting, etc. in the video mode or the slideshow mode and a progressive bar for indicating a position of an image that is being displayed in the display window in a reproduction section may be displayed on the screen.

When a second key scene is displayed by a key scene shifting input while the first key scene is being displayed as shown in FIG. 16, the second key scene may be displayed in the display window after the first key scene, and also the second text section linked to the second key scene may be displayed in the comment window, as shown in FIG. 17. Also, when the second text section is displayed as shown in FIG. 17 while the first text section is being displayed as shown in FIG. 16, text of the comment window may be scrolled, vertically moved in units of a row, or turned in units of a page.

FIGS. 16 and 17 show examples in which only a text section linked to a key scene that is being displayed is displayed in a comment window. However, alternatively, other text sections may be additionally displayed in the comment window. For example, the text section corresponding to the key scene in the display window may be displayed in an upper portion of the comment window, and then a following text section may be additionally displayed when the comment window has an empty space in which text may be displayed.

Figure 18:
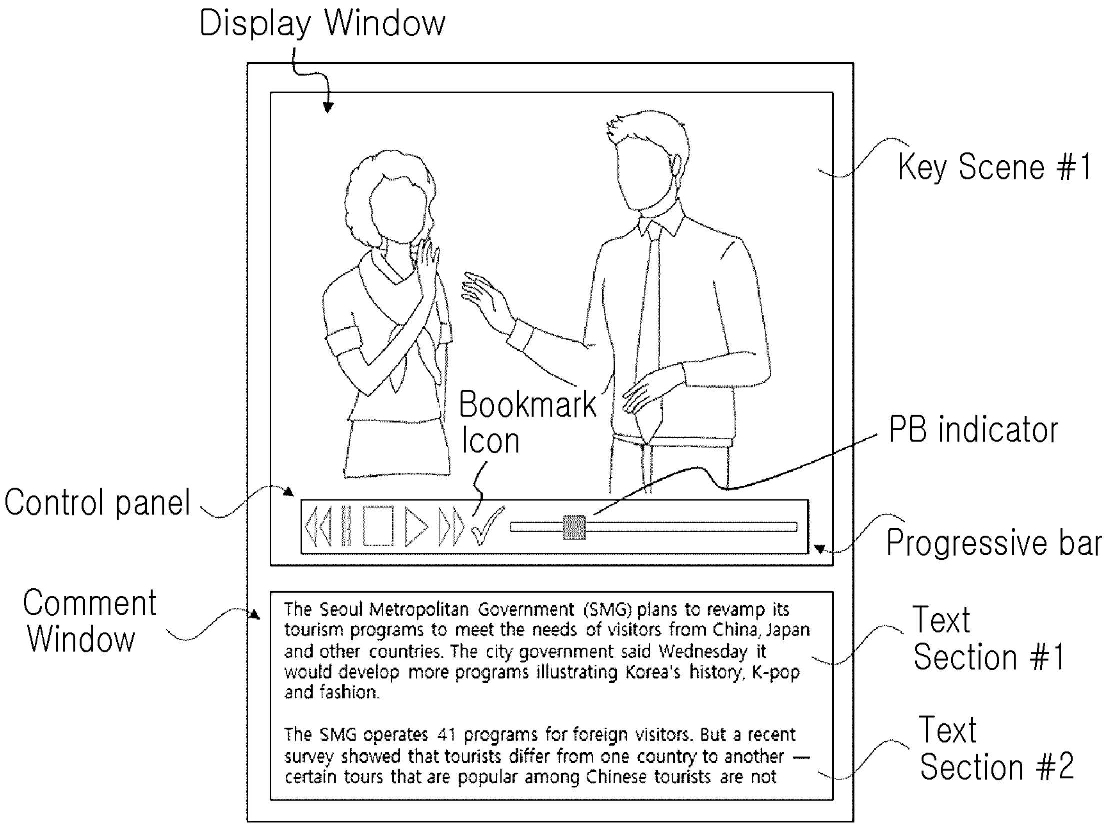
FIGS. 18 and 19 are diagrams showing other examples of a multimedia content display screen provided together with a comment according to an embodiment of the present invention.
Figure 19:
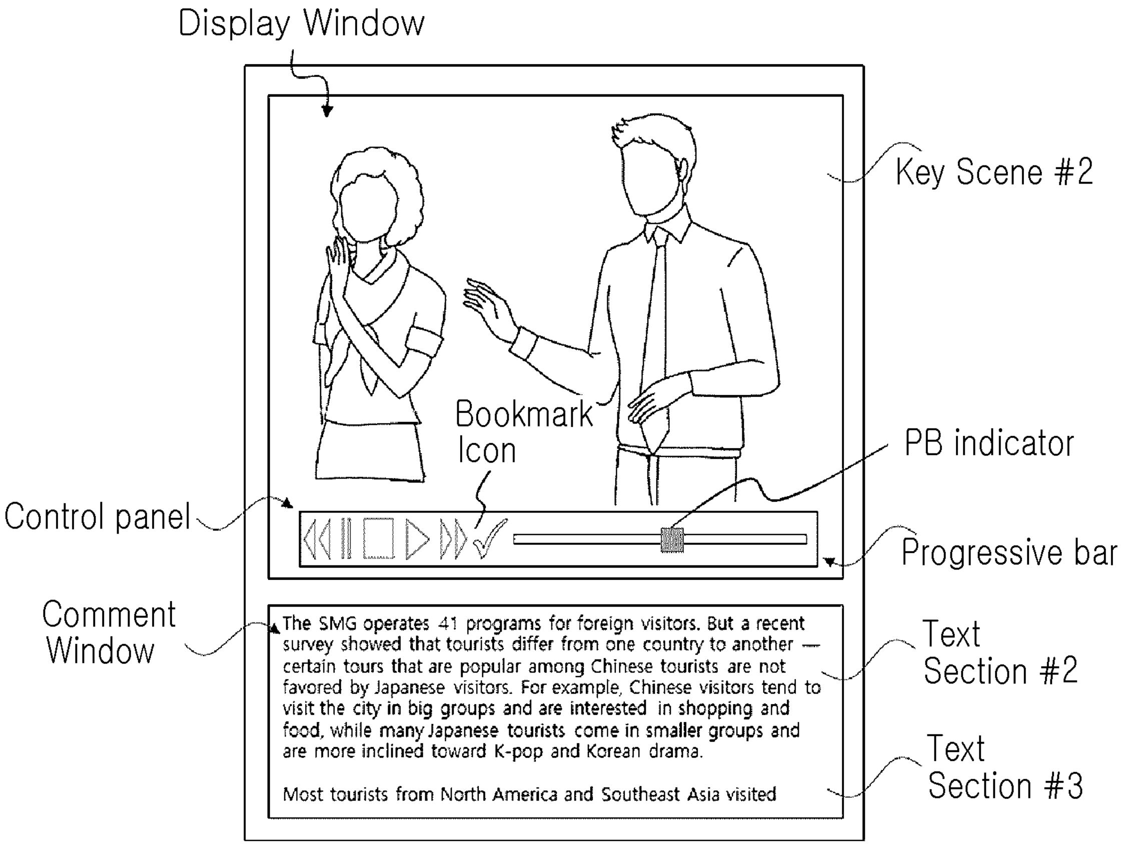

FIGS. 18 and 19 are diagrams showing other examples of a multimedia content display screen provided together with a comment according to an embodiment of the present invention.

Referring to FIG. 18, while a first key scene is being displayed in the display window, a first text section linked thereto may be displayed in an upper portion of a comment window, and then a portion of a second text section may be displayed in an empty space of the comment window. When the comment window has an additional empty space in which text may be displayed even after the second text section is displayed, third and fourth text sections may be additionally displayed.

Also, when a second key scene is displayed by a key scene shifting input while the first key scene is being displayed as shown in FIG. 18, the second key scene may be displayed in the display window, and the third text section may be displayed in the empty space of the comment window, which is the upper portion of the comment window in which the second text section is displayed, as shown in FIG. 19.

Also, when the second text section is displayed as shown in FIG. 19 while the first text section is being displayed as shown in FIG. 18, text of the comment window may be scrolled, vertically moved in units of a row, or turned in units of a page.

Unlike the description with reference to FIGS. 16 to 19, all text sections of the comment data may be displayed in the comment window. Also, among all of the text sections, a text section corresponding to a key scene that is being displayed in the display window may have different display attributes (e.g., a font type, a size, an underline, a color, etc.) from the other text sections.

Figure 20:
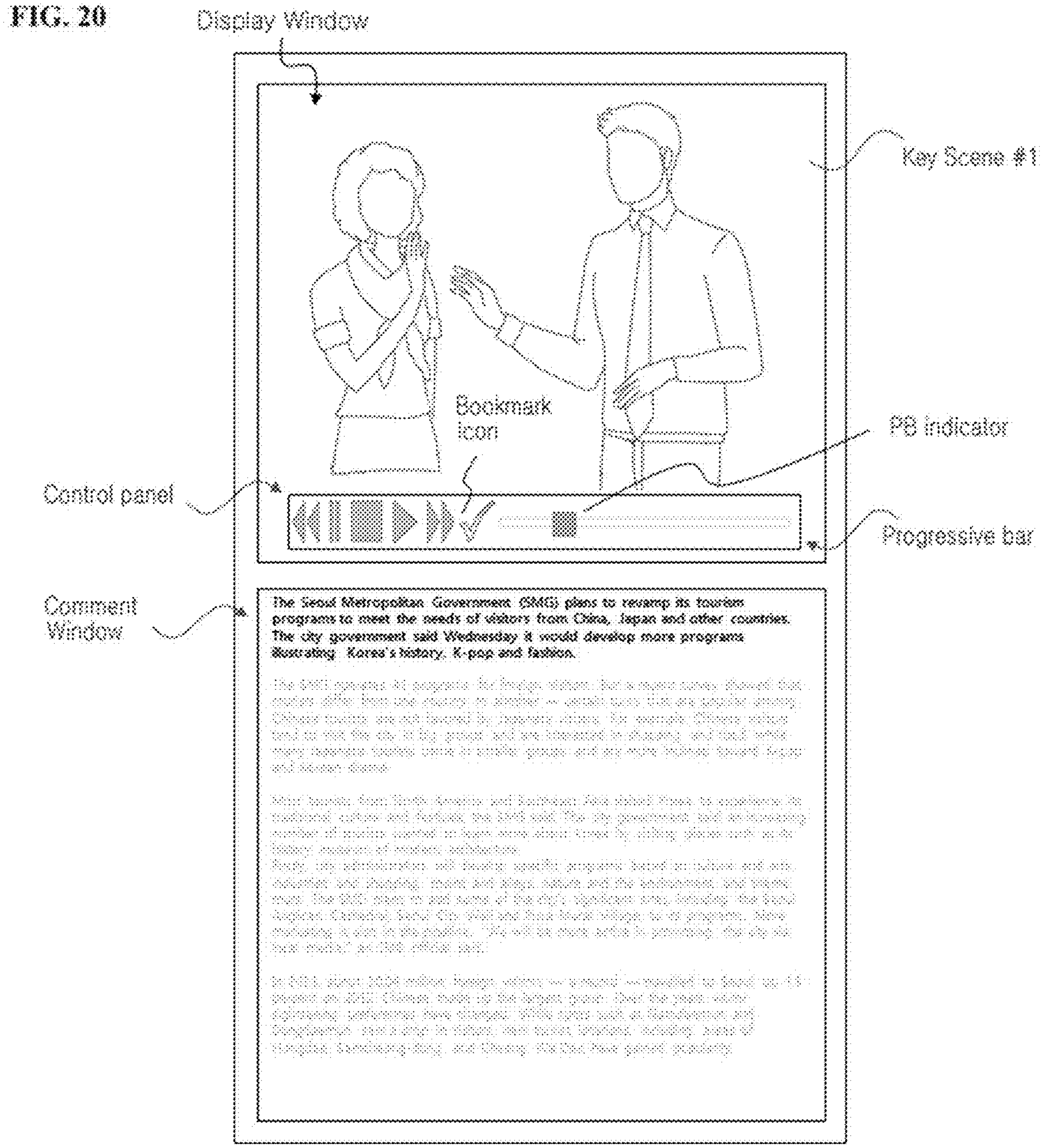
FIGS. 20 and 21 are diagrams showing still other examples of a multimedia content display screen provided together with a comment according to an embodiment of the present invention.
Figure 21:
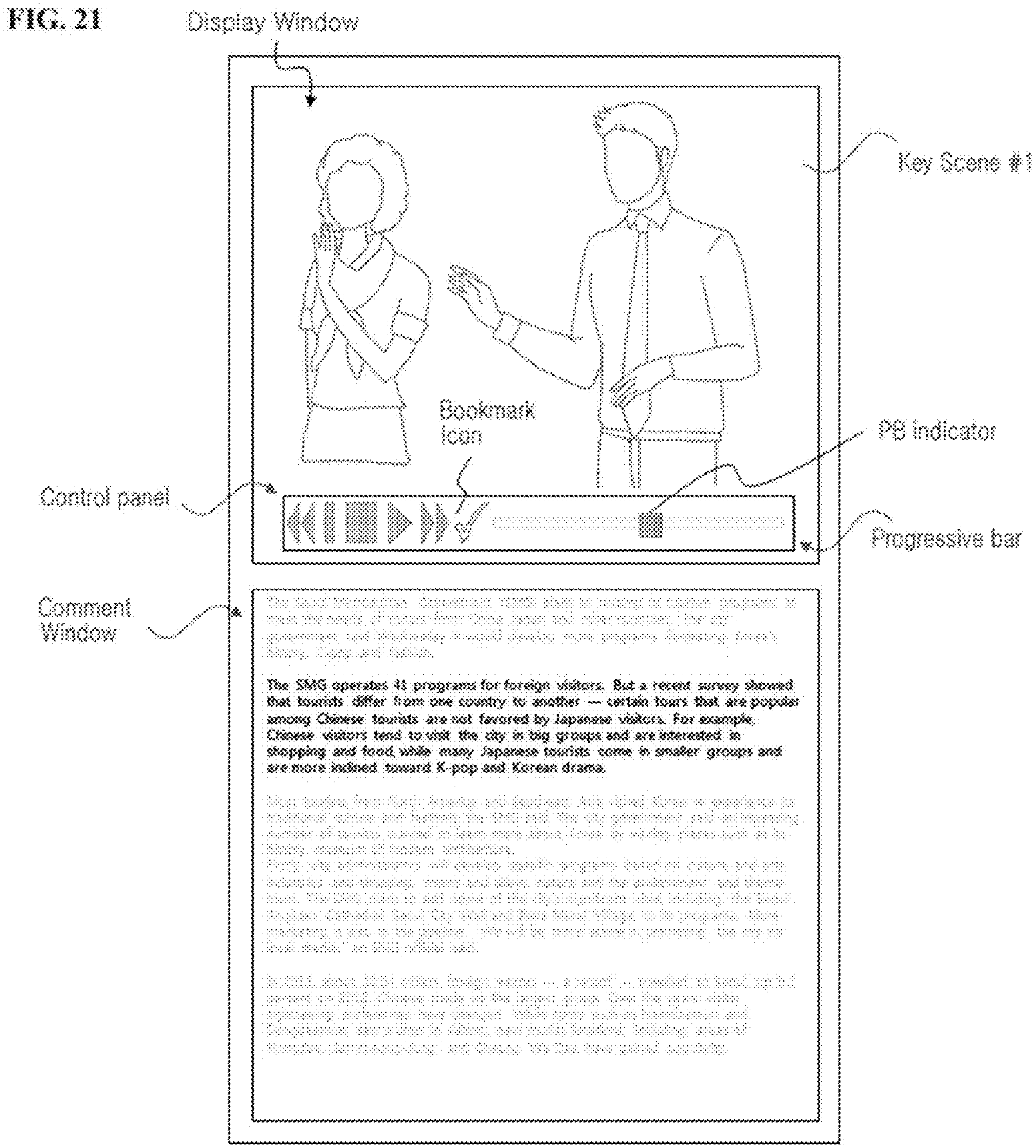

FIGS. 20 and 21 are diagrams showing still other examples of a multimedia content display screen provided together with a comment according to an embodiment of the present invention.

Referring to FIG. 20, all text sections of the comment data are displayed together with a first key scene. Also, it can be seen that, among the text sections, the first text section matching the first key scene may be displayed in a color that is different from those of the other text sections. Similarly, referring to FIG. 21, it can be seen that a second key scene is displayed in the display window, and also the second text section may be displayed in a color that is different from those of the other text sections.

By displaying a text section linked to a key scene in the display window to have different display attributes from the other text sections, a user can be made intuitively aware of a comment regarding an image that is being displayed in the display window.

It has been described that a key scene is displayed in the display window and a text section is displayed in the comment window in the slideshow mode. However, in the video mode, a video may be displayed in the display window with reference to video data, and an appropriate text section may be displayed in the comment window according to a playback time point in a reproduction section of the video data. In detail, a text section linked to an event section to which the playback time point of the video belongs may be displayed in the comment window.

Also, the text section displayed in the comment window may be naturally scrolled, refreshed in units of a row, or turned and refreshed in units of a page according to a change in the playback time point.

<Display of Summary Information>

The summary information may be displayed in addition to a key scene and a text section. Here, summary information may refer to text obtained by summarizing details of the text section. For example, the summary information may be a title or summary of each text section. Such summary information may be extracted from a key sentence (e.g., the first, the last sentence, etc.) of a text section and generated by the electronic device 1000. It should be appreciated that the summary information may be separately input by a user.

Figure 23:
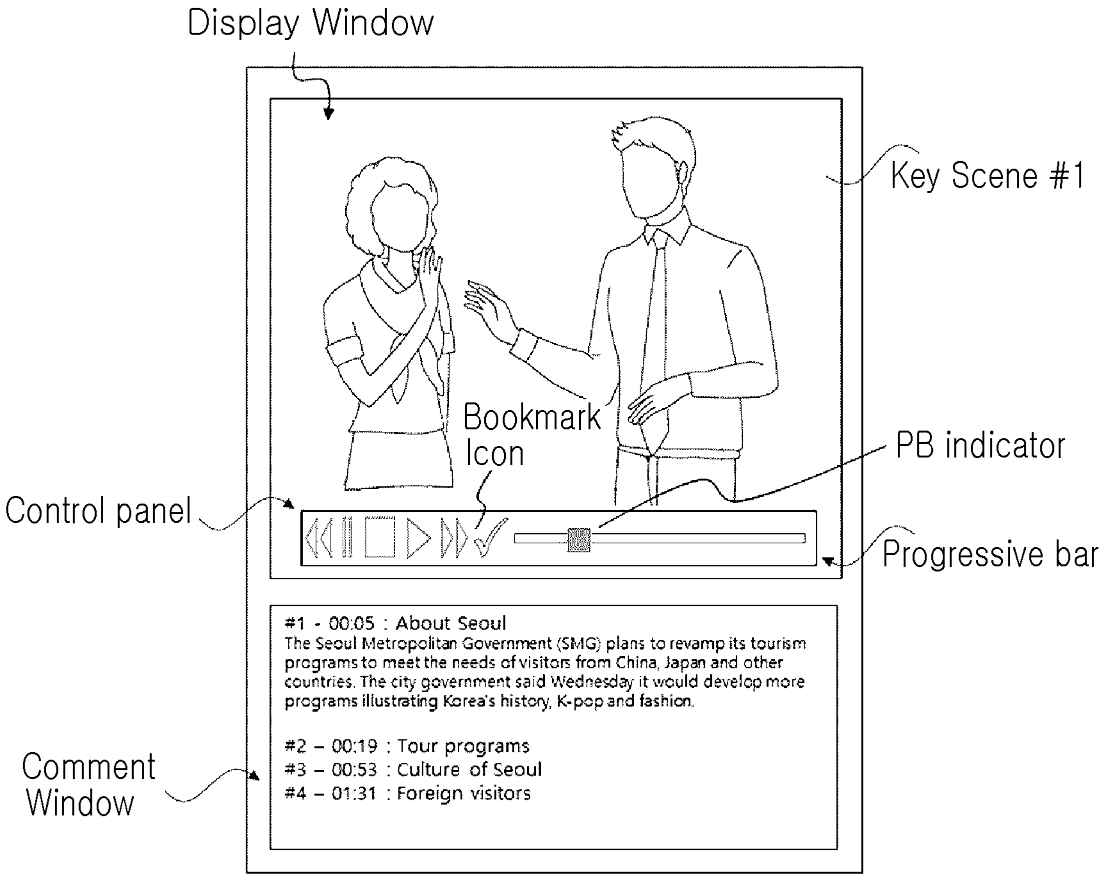

FIGS. 22 and 23 are diagrams showing examples of a multimedia content display screen provided together with a comment and summary information according to an embodiment of the present invention.

Referring to FIG. 22, a display window, a comment window, and a summary window may be provided on a screen. Summary information regarding all text sections may be displayed in the summary window. The summary information may include a number indicating an order of a key scene, a text section, an event section, an event time point (mainly, a start time point) of the event section, and a tile of the text section.

Also, referring to FIG. 23, a display window and a comment window may be provided on the screen. Here, the summary information may be displayed in the comment window together with the text section.

By displaying the summary information in addition to the text section, a user can easily be made aware of a brief overview of all text sections.

<Key Scene Shifting Using Text Section or Summary Information>

As described above, according to the present invention, it is possible to implement a key scene shifting in the slideshow mode or a playback time point shifting in the video mode through a user input with regard to a progressive bar, a control panel, or a display window, and it is also possible to perform the key scene shifting in the slideshow mode or the playback time point shifting in the video mode through a user input with regard to the text section or the summary information displayed in the comment window.

As an example, when scrolling (e.g., a touch input, a mouse wheel manipulation, etc.) or a page shifting input (e.g., a touch, a keyboard up key or down key manipulation, a page up or a page down key manipulation, etc.) is performed on the comment window, a text section preceding or following a current text section may be displayed in the comment window, and a preceding or following key scene may be displayed in the slideshow mode or a playback time point may be shifted to a preceding or following event time point close to the playback time point in the video mode in conjunction with the displaying.

Referring back to FIGS. 16 and 17, when a user scrolls the comment window in order to view a following text section while a first key scene and a first text section are being displayed as shown in FIG. 16, a shifting may be performed to display a second key scene and a second text section as shown in FIG. 17. In the video mode, a playback time point may be shifted to a following event time point close to the playback time point of FIG. 16.

Conversely, when a user scrolls the comment window in order to view a preceding text section while the second key scene and the second text section are being displayed as shown in FIG. 17, a shifting may be performed to display the first key scene and the first text section as shown in FIG. 16. Also, in the video mode, a playback time point may be shifted to a preceding event time point close to the playback time point of FIG. 17.

As another example, when all text sections are displayed in the comment window, an input for selecting a specified text section may be received, and a key section or a playback time point may be shifted in response to the input.

Referring back to FIGS. 20 and 21, when a user selects the second text section while the first key section and all of the text sections are being displayed as shown in FIG. 20, the second key scene may be displayed as shown in FIG. 21. Also, among all of the text sections, the second text section may be highlighted.

As still another example, by selecting a piece of the summary information, a text section indicated by the selected summary information and also a key scene corresponding to the selected summary information may be displayed or a playback time point may be shifted to an event time point corresponding to the selected summary information.

Referring back to FIGS. 22 and 23, when "#2 ? 00:19: Tour programs," which is a piece of summary information corresponding to the second text section, is selected while the first key scene and the first text section are being displayed, the second key scene and the second text section may be displayed.

When there is a scroll bar as shown in FIG. 22, scrolling of the text section may be adjusted through the scroll bar, and a key scene or a playback time point may be shifted corresponding to the text section displayed by the scroll.

may shift a key scene or a reproduction point so as to correspond to a text section displayed by scrolling.

<Multimedia Content Display Method>

A method for displaying multimedia content according to an embodiment of the present invention will be described below.

Figure 24:
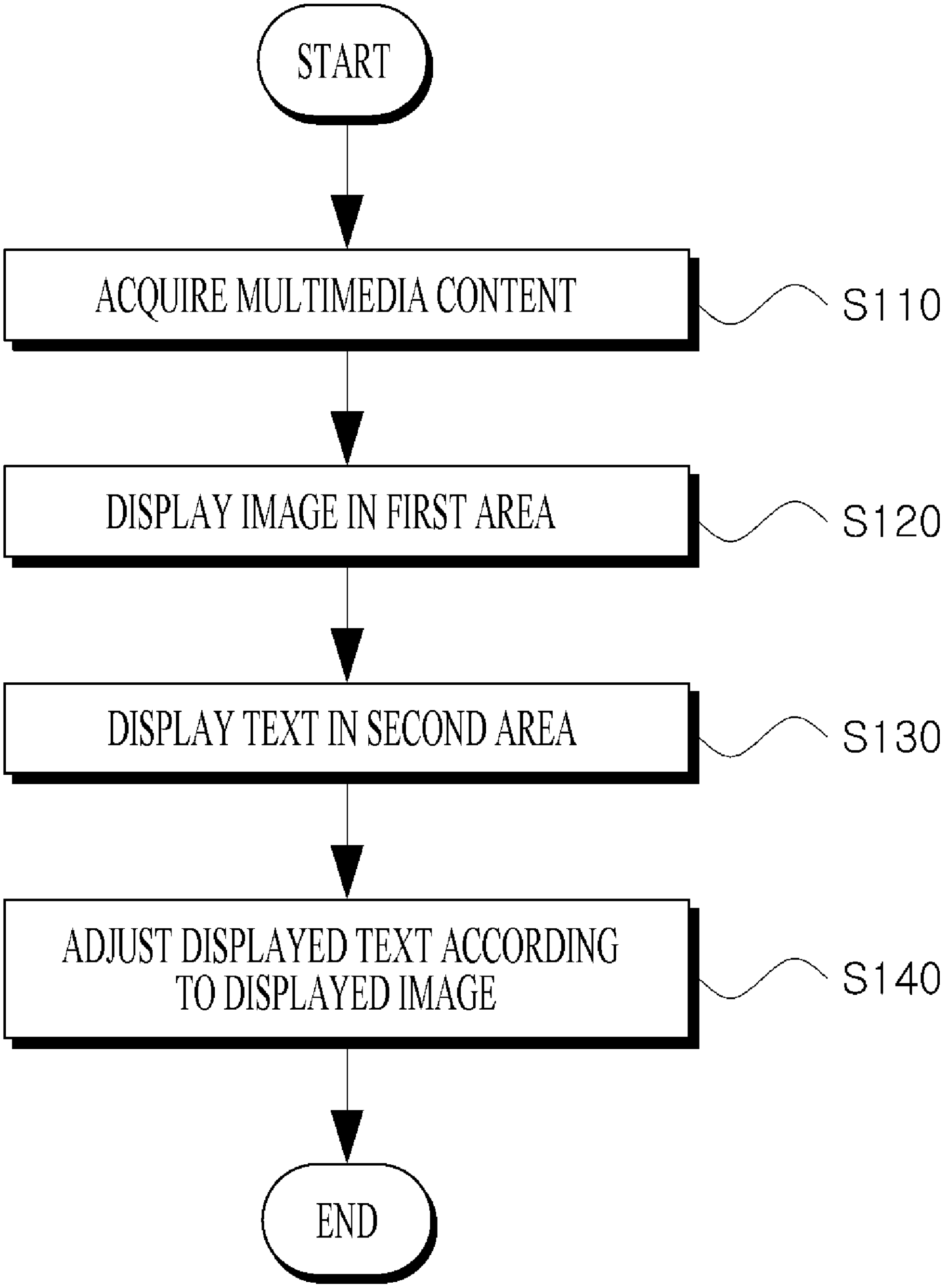
FIG. 24 is a flowchart of A method for displaying multimedia content according to an embodiment of the present invention.

FIG. 24 is a flowchart of A method for displaying multimedia content according to an embodiment of the present invention. Referring to FIG. 24, the method for displaying multimedia content may include acquiring multimedia content (S110), displaying an image in a first area according to one of a video mode and a slideshow mode (S120), displaying text in a second area (S130), and adjusting the displayed text according to the displayed image (S140). The above-described steps will be described in detail below.

First, the electronic device 1000 may acquire multimedia content (S110). The multimedia content may include video data, slide data, and comment data.

Next, the electronic device 1000 may output an image in a first area using the multimedia content (S120). In this case, the image may be output according to any one of the video mode and the slideshow mode. In the video mode, the electronic device 1000 may reproduce a video with reference to the video data. In the slideshow mode, the electronic device 1000 may display a key scene with reference to the slide data. In this case, the modes may be switched according to a user input or the like.

While the image is being output, the electronic device 1000 may display text in a second area that is different from, or included in, the first area (S130). The text may be output with reference to the comment data. In detail, the output text may include a text section linked to an event section corresponding to a playback time point of the displayed key scene or video among pieces of the comment data and may further include following text sections. The second area may be included at a certain position of the first area when the text is displayed in the form of a subtitle and may be positioned in a space separate from the first area when the text is displayed in the form of an article.

Next, the electronic device 1000 may adjust the text displayed in the second area according to the displayed image (S140). For example, in the slideshow mode, a text section linked to a key scene may be displayed while the key scene is being switched or may be displayed to have different display attributes from other text sections. As another example, in the video mode, a text section linked to an event section to which a current playback time point belongs may be displayed while the playback time point is being changed or may be displayed to have different display attributes from the other text sections.

In S140, the displayed text may be adjusted through an operation including at least one of a scrolling, a up-and-down moving of the text, a up-and-down shifting of the page, and a page turning.

Conversely, when a user input an operation with regard to the text such as a scrolling, a up-and-down moving of the text, a up-and-down shifting of the page, and a page turning is received and the displayed text section is changed, the image displayed in the first area may be adjusted. That is, a video scene or a key scene corresponding to an event time point corresponding to the text section displayed in the second area may be displayed in the first area.

In addition to the text section of the comment data, summary information regarding the text section may be displayed in the second area.

Figure 25:
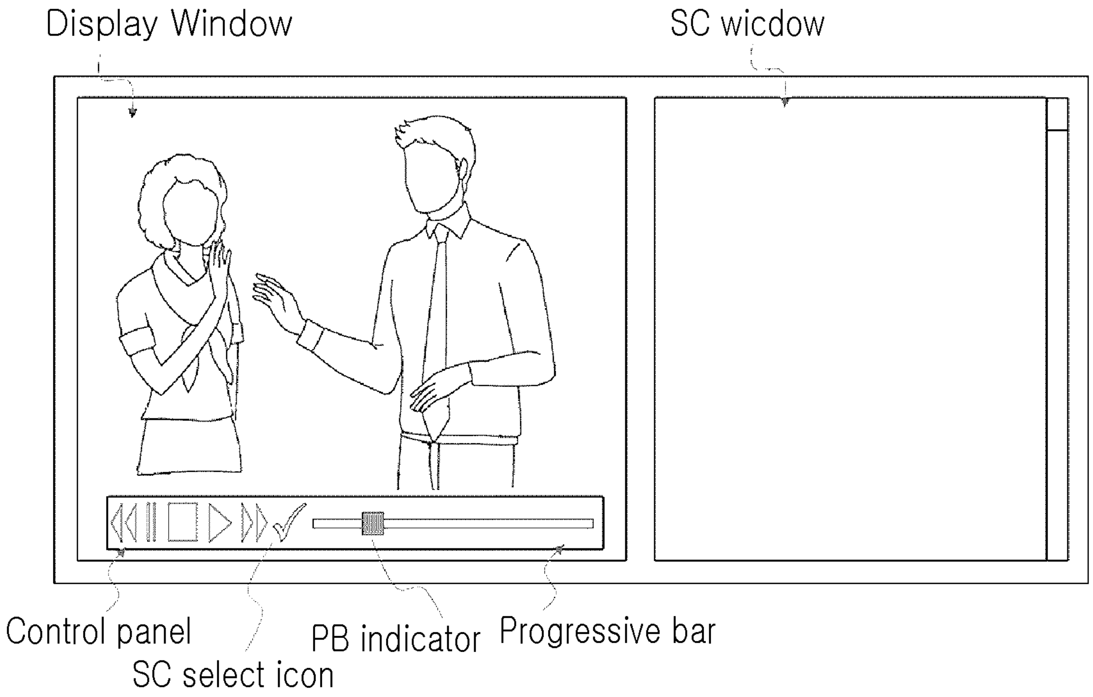
FIGS. 25 to 27 are diagrams showing still other examples of selecting a key scene according to an embodiment of the present invention.
Figure 26:
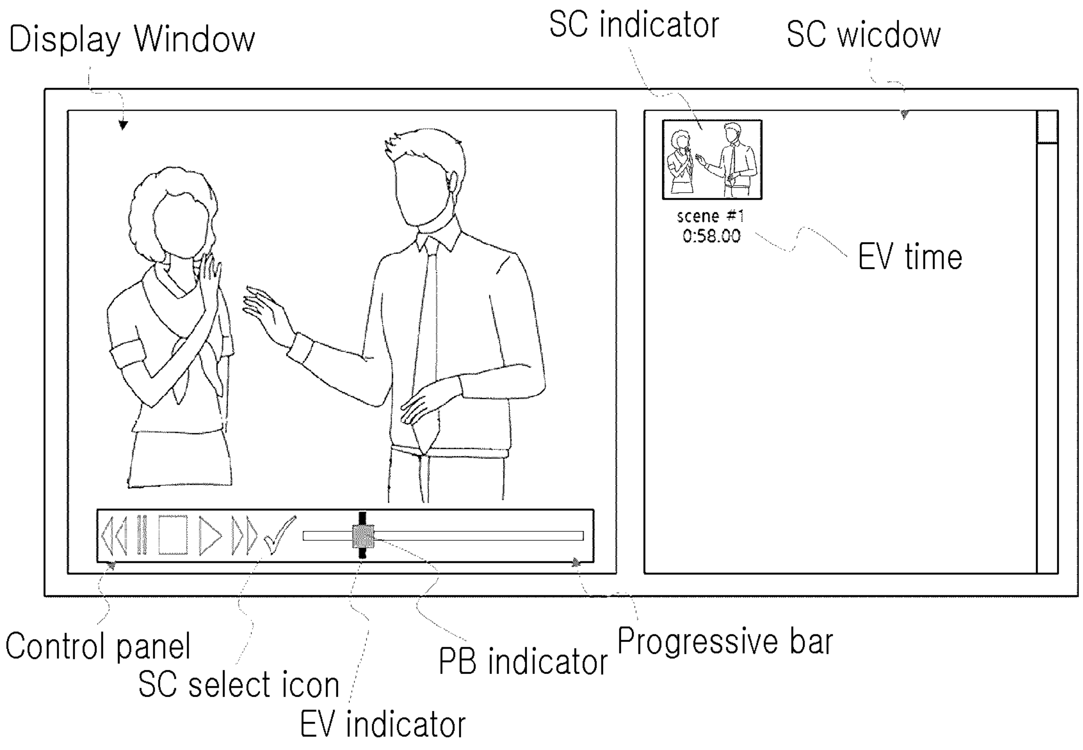
Figure 27:
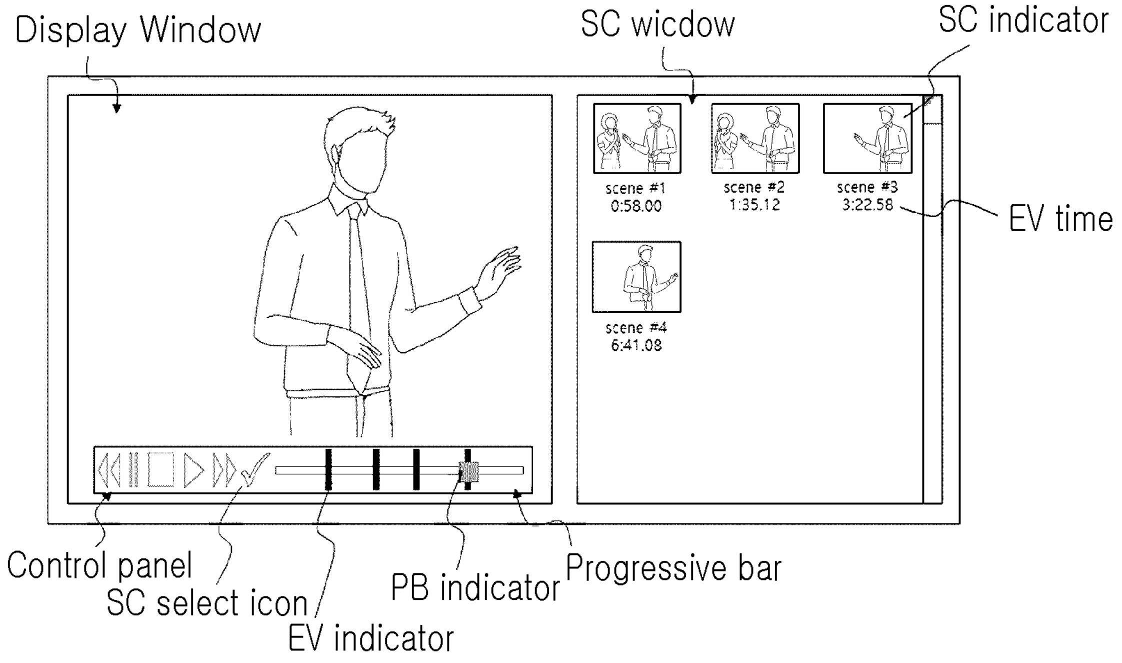

FIGS. 25 to 27 are diagrams showing still other examples of selecting a key scene according to an embodiment of the present invention.

Referring to FIG. 25, the electronic device 1000 may reproduce the video data through the display-type output unit 1200. Here, the video data may be output through a display window. In addition, a control panel for controlling the reproduction of the video data, a key scene selection icon (an SC selection icon) for receiving a key scene selection input, a progressive bar corresponding to a reproduction section of the video data, and a playback time point indicator (a PB indicator) for displaying a progress time point of the reproduction of the video data in the progressive bar may be further included in the display window.

While the video is being reproduced, the key scene selection input may be received from a user through the input unit 1100. Here, the key scene selection input may be performed through various methods of, for example, clicking a predetermined button of the input unit 1100, touching a screen, or selecting the SC selection icon on the control panel of FIG. 25.

When the key scene selection input is received, an event time point may be determined on the basis of the key scene selection input. For example, the event time point may be a playback time point in a reproduction section of the video when the key scene selection input is received.

As shown in FIG. 26, the determined event time point may be displayed as the EV indicator for indicating the event time point on the progressive bar.

When the event time point is determined, an image frame (a still image) of the video data corresponding to the event time point may be acquired as a key scene. The image frame itself may be acquired as the key scene. However, the key scene may be acquired by processing the image frame if necessary.

The acquired key scene may be displayed in a key scene window (an SC window). In this case, the key scene may be displayed in the form of a thumbnail. Also, a number of the key scene and an event time point (also referred to as an EV time) for the key scene may be displayed.

When the key scene is selected, real-time reproduction of the video data may be automatically stopped. Thus, a user may restart the reproduction of the video data by controlling a play button of the control panel or the like.

When a plurality of key scene selection inputs occur while the video data is being reproduced, a plurality of event time points may be selected, and a key scene may be selected for each of the event time points. Referring to FIG. 27, it can be seen that four selected key scenes are displayed in the SC window in the form of thumbnails. Likewise, as shown in FIG. 27, it can be seen that the EV indicator indicating four event time points are displayed in the progressive bar. Here, when a user selects any one of the key scenes in the SC window, a playback time point of the video data may be shifted to an EV time of the selected key scene.

Multimedia content may be generated by linking key scenes selected in this way to video data through an EV time thereof to generate slide data as described above.

The operation of generating multimedia content by generating slide data from video data through a key scene selection input of a user has been described. Now, an operation of acquiring and receiving comments matching an event time through a comment input from a user and generating comment data will be described.

Also, the key scene does not need to be determined as only a still image of an image frame corresponding to an event time point. In some cases, at any event time point, a user may need to select an image frame of video data corresponding to a time point that is different from the event time point.

In this case, referring back to FIG. 30, a key scene to be substituted may be selected first. The selection may be performed by selecting any one key scene from the SC window. Next, a substitute scene for the selected key scene may be selected. As an example, the substitute scene may be selected by reproducing the video data again and performing a substitute scene selection input equivalent to the key scene selection input. Alternatively, the substitute scene may be selected by moving an event indicator (EV) in the progressive bar. In this case, a scene that does not correspond to an EV time may be selected as a key scene by changing the EV time while maintaining the key scene.

When the substitute scene is selected, a key scene shifting may be completed by changing the slide data so that a key scene corresponding to the EV time may be substituted with the substitute scene. A substitute time point of the substitute scene may be set only within a predetermined range from the event time point.

Figure 28:
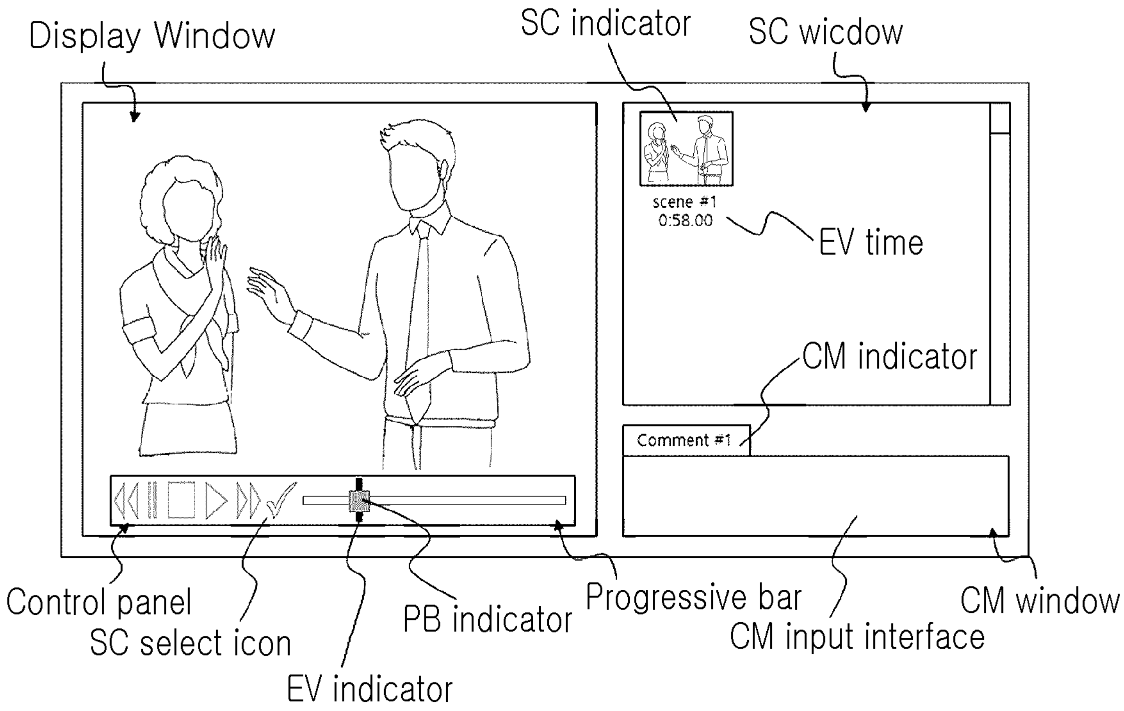
FIGS. 28 to 30 are diagrams showing examples of a comment data generation operation according to an embodiment of the present invention.
Figure 29:
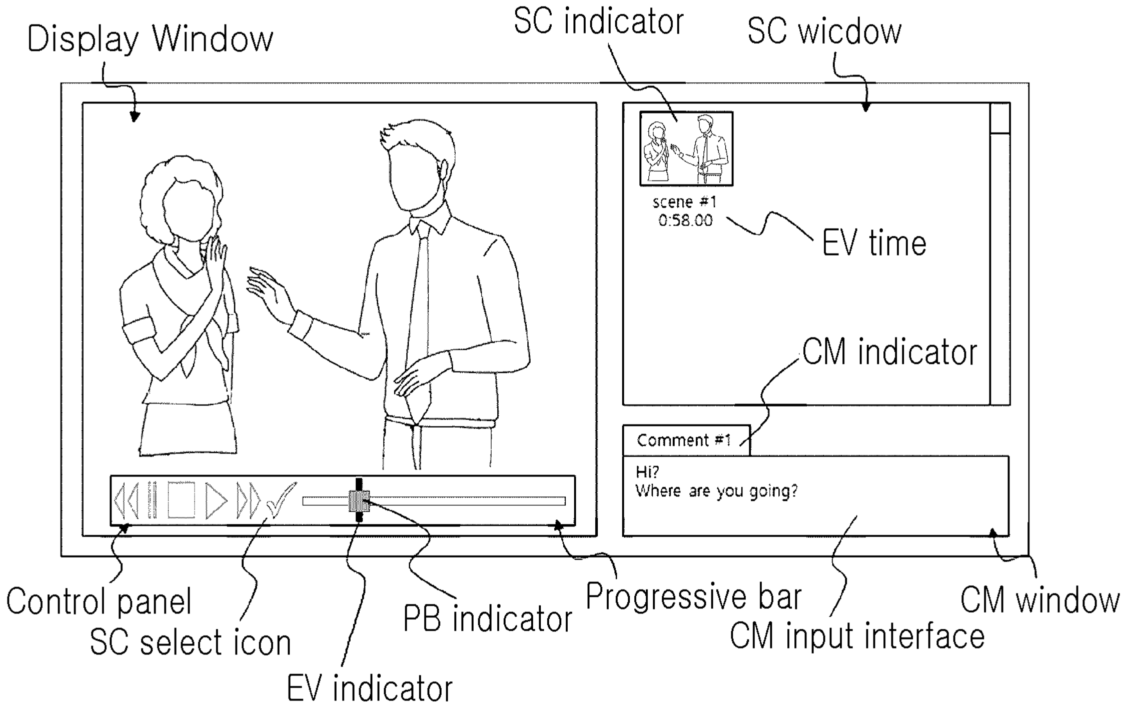
Figure 30:
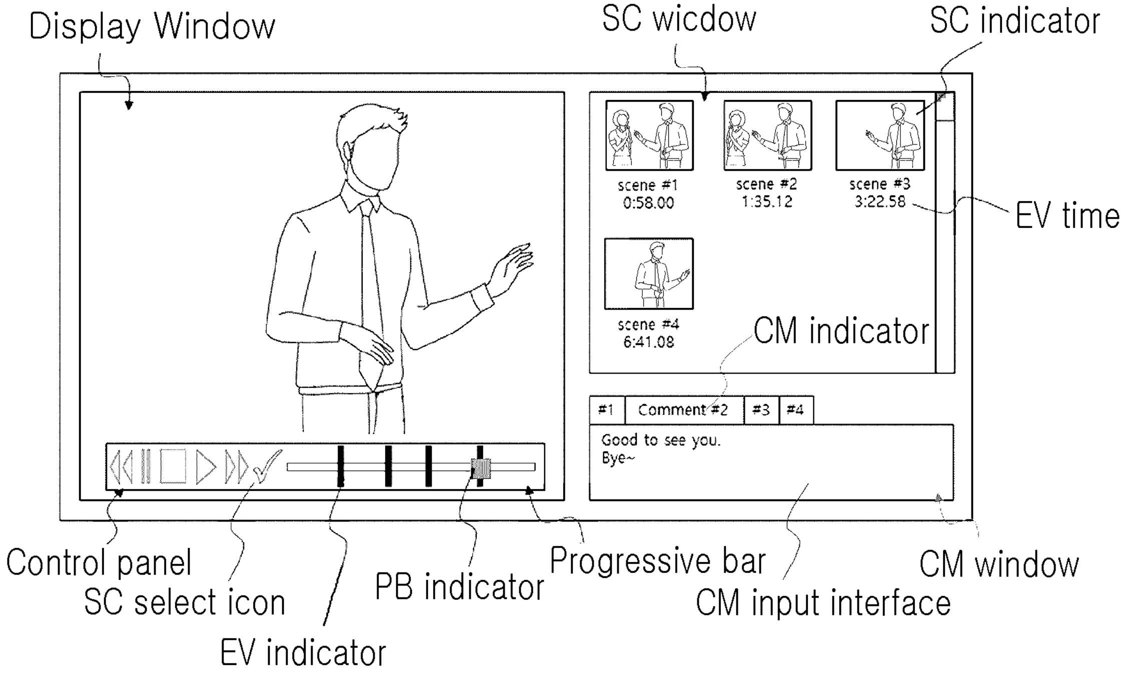

FIGS. 28 to 30 are diagrams showing an example of a comment data generation operation according to an embodiment of the present invention.

Referring to FIG. 28, the display-type output unit 1200 of the electronic device 1000 may display a comment window (a CM window) in addition to the display window for reproducing the video data and the SC window for displaying a selected key scene. Here, the CM window may include a comment indicator (a CM indictor) that indicates a comment number and a comment input interface (a CM input interface) for receiving or displaying details of a comment.

When a key scene is selected, a CM indicator corresponding thereto may be generated. For example, as shown in FIG. 28, when the key scene "scene #1" is generated for the event time "0:58.00," the comment indictor "Comment #1" may be displayed in the CM window. Here, when text is received from a user through the CM input interface, the received text may be acquired as a comment corresponding to a corresponding EV time and key scene. Referring to FIG. 29, when a user inputs text "Hi? Where are you going?" through the CM input interface, the text may be acquired as a comment for "Comment #1."

Similarly, referring to FIG. 30, when key scenes are generated for a plurality of event time points, a plurality of key scenes may be included in the SC window. Likewise, a plurality of CM indicators may be displayed in the CM window. In this case, when an input for selecting any one of the CM indictors is received from a user, a comment corresponding to the selected CM indictor may be received. In FIG. 30, it can be seen that "Good to see you. Bye~" is input as a second comment corresponding to "scene #2," which is a second key scene. In this case, a playback time point of the video data may or may not be shifted to an EV time corresponding to the selected CM indicator.

Through the above-described procedure, a comment may be input for each event time point. It should be appreciated that, in some cases, no comment exists for some event time points because comments do not need to be input for every event time point.

When comments are acquired for event time points, multimedia content may be generated by comment data being generated by matching the comments with the event time points or key scenes corresponding to the event time points.

<Content Generation Method>

A multimedia content generation method according to an embodiment of the present invention will be described below.

First, the electronic device 1000 may acquire video data. In detail, the controller 1500 may read video data pre-stored in the memory 1400 or may download or stream video data from the outside through the communication unit 1300. Here, the video data may be an image that is captured by a camera in real-time.

Next, the electronic device 1000 may reproduce the video data. Also, the electronic device 1000 may acquire a key scene selection input for a user while the video data is being reproduced.

The electronic device 1000 may determine an EV time on the basis of the key scene selection input. The EV time may be a playback time point corresponding to the acquisition of the key scene selection input in a reproduction section of the video data.

When the EV time is determined, the electronic device 1000 may select a key scene on the basis of the determined event time point. The key scene may be a still image corresponding to an image frame of the video data corresponding to the event time point.

When key scenes are selected in this way, the electronic device 1000 may generate slide data by matching the key scenes with event time points, and thus may generate multimedia content.

In this process, a user may set a comment corresponding to each of the key scenes. The comment may be set by selecting a CM indictor generated according to the key scene. When text is input for the set comment, comment data may be generated by matching the text with a key scene associated therewith or an EV time of the key scene. Thus, it is possible to generate multimedia content with comment.

<Multimedia Content Reproduction Operation>

The slideshow mode in which key scenes selected as described above are sequentially shown as still images will be described below.

In the slideshow mode, key scenes may be sequentially displayed as still images in a slideshow manner. Here, the slideshow manner may refer to a method for outputting a specified key scene as a still image and then receiving a user input or automatically outputting a following or preceding key scene as a still image.

As described above, in the slideshow mode, a slide shifting function may be provided to sequentially output key scenes.

Figure 31:
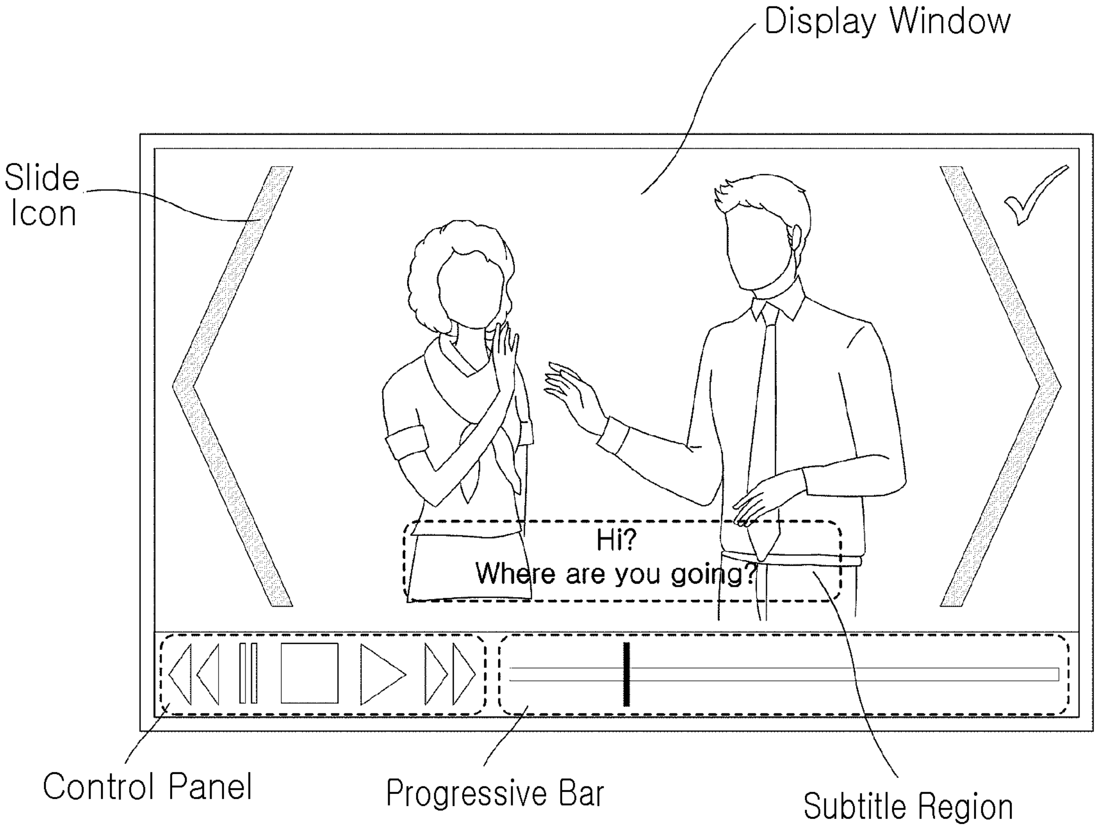
FIG. 31 is a diagram showing a default screen for a content reproduction method according to an embodiment of the present invention.

FIG. 31 is a diagram showing a default screen for a content reproduction method according to an embodiment of the present invention.

Referring to FIG. 31, a display window, a progressive bar, a control panel, a slide icon, and a bookmark icon may be included in a default screen.

A key scene may be displayed in the display window as a still image. Also, in a portion of the display window, a subtitle region in which a comment is displayed may be positioned over the still image. It should be appreciated that, in addition to a case in which a subtitle region is present and a subtitle using comment data is displayed in the subtitle region in the video mode or the slideshow mode, a speech bubble may be displayed corresponding to a speaker who speaks a corresponding subtitle in an image and the subtitle may be displayed in the speech bubble. Also, icons for various kinds of user inputs (for reproducing, stopping, pausing, rewinding, and fast-forwarding a video) which are used in the video mode may be arranged on the control panel. Also, a bar corresponding to a reproduction time period of an entire video and an icon indicating a current playback time point on the bar are positioned on the progressive bar.

The slide icon may be positioned on left and right sides of the display window. The slide icon is associated with a user input for performing a slide shifting during the slideshow mode. Also, the bookmark icon is associated with a user input for a bookmark setting.

Various kinds of functions may be performed in the multimedia content reproduction method through a user input or touch input selecting an icon provided by the default screen.

First, the video mode may be switched to the slideshow mode as follows.

When a user input selecting a slide icon is received from a user while content is being reproduced in the video mode, the electronic device 1000 may change a reproduction mode of the content from the video mode to the slideshow mode. In detail, when a user input selecting a right slide icon is received, the slideshow mode is entered by displaying a key scene corresponding to a time point directly after a playback time point on the timeline corresponding to the reception in the video mode as a still image. When a user input selecting a left slide icon is received, the slideshow mode is entered by displaying a key scene corresponding to a time point directly before a playback time point on the timeline corresponding to the reception in the video mode as a still image.

Figure 32:
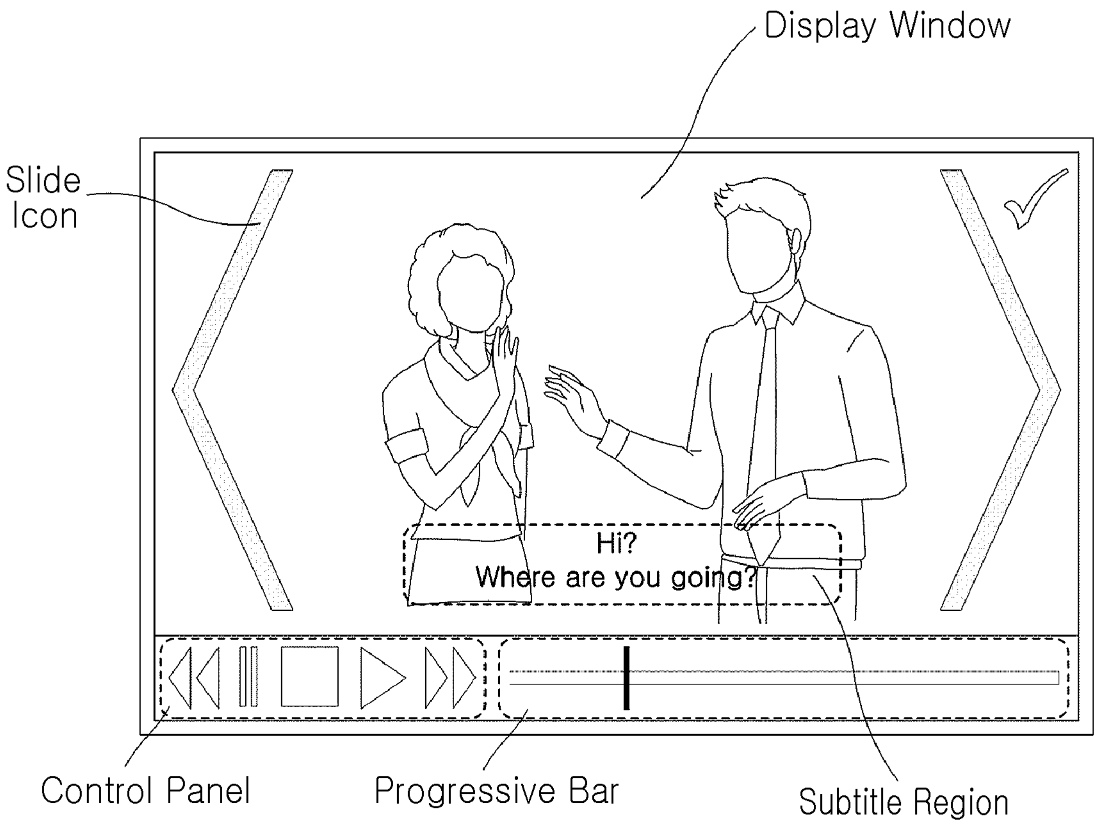
FIG. 32 is a diagram showing a user input for mode switching according to an embodiment of the present invention.

Alternatively, when a horizontal drag touch input is applied in the video mode, the electronic device 1000 may switch the reproduction mode to the slideshow mode. FIG. 32 is a diagram showing a user input for mode switching according to an embodiment of the present invention. A reproduction mode may be switched when a drag touch input is applied to a subtitle region. In detail, it may be determined that the drag touch input is applied to the subtitle region when a start time point of the touch input is within the subtitle region. Here, depending on a horizontal movement direction of the drag touch input, whether to output a key scene before or after a playback time point of a video on the timeline as a still image may be determined when the slideshow mode is entered. For example, as shown in FIG. 32, when a direction of the touch input is rightward, a key scene after the playback time point on the timeline at which the touch input is received may be output. FIG. 32 also shows a selection of a slide icon for a slide shifting, and thus the following description refers to FIG. 32.

Figure 33:
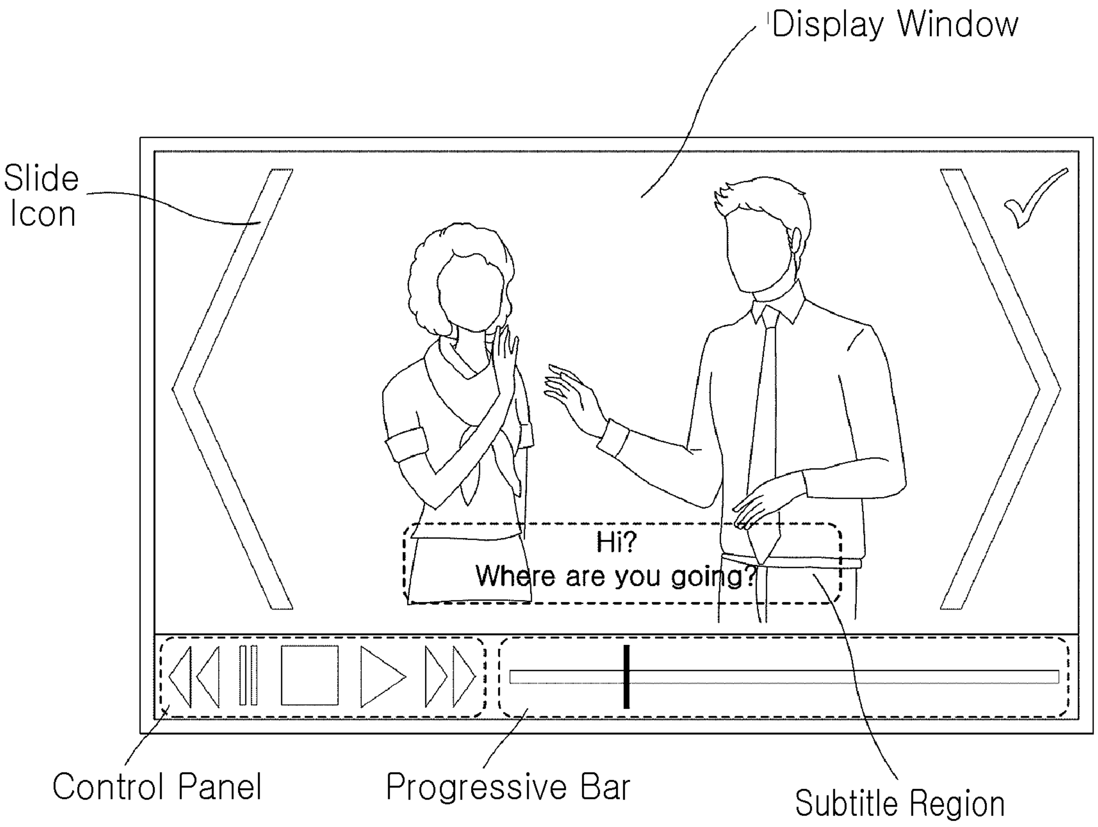
FIG. 33 is a diagram showing a change in subtitle attributes in a slideshow mode according to an embodiment of the present invention.

When the video mode is entered from the slideshow mode as described above, the default screen may be partially changed. As an example, the slideshow mode may have different comment attributes from the video mode. Comment attributes may refer to a font size, a color, a font type, and a display position of a comment. FIG. 33 is a diagram showing a change in comment attributes in the slideshow mode according to an embodiment of the present invention. As an example, referring to FIGS. 32 and 33, it can be seen that a font size of a comment is increased when the slideshow mode is entered.

It is also possible to change from the slideshow mode back to the video mode. In this case, a video may be reproduced immediately from a playback time point of a slideshow. Alternatively, the video may be reproduced from a time point a predetermined time interval before the playback time point of a slideshow. Thus, the video may be naturally reproduced.

In the slideshow mode, a slide shifting between key scenes may be performed in a manner similar to the mode switching. In other words, the slide shifting may be performed by the slide icon being selected or a horizontal drag touch being applied.

Figure 34:
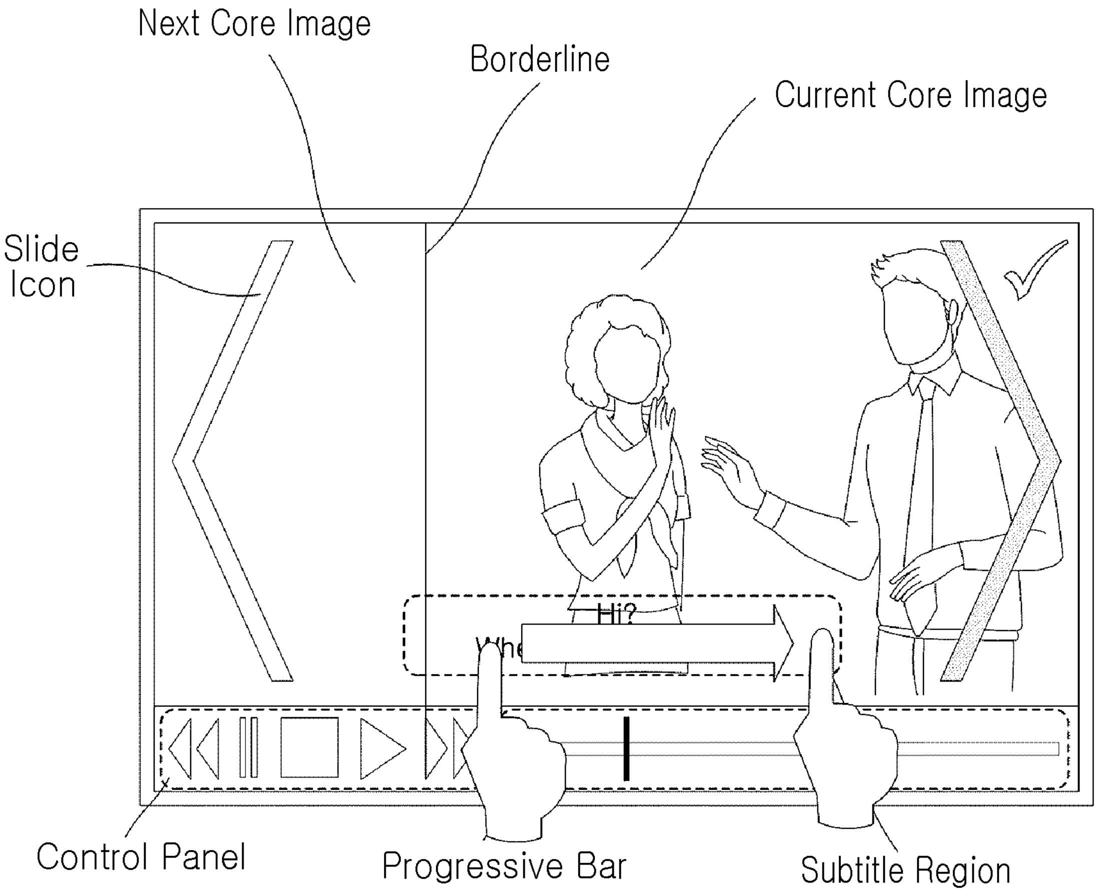
FIG. 34 is a diagram showing a visual effect of a slide shifting in a slideshow mode according to an embodiment of the present invention.

In the slideshow mode, a slide shifting between key scenes may generate a visual effect in which a screen is changed in a sliding way. FIG. 34 is a diagram showing a visual effect of a slide shifting in the slideshow mode according to an embodiment of the present invention. Referring to FIG. 34, when a drag touch input is received in the slideshow mode, a current key scene moves in a display window in a direction of the drag touch input, and a key scene to be displayed is output to an empty space caused by the slide shifting. In this case, the movement of the key scene is proportional to a length of the drag. In this case, when a movement distance of the key scene is greater than or equal to a predetermined distance, that is, when an end (a left end in FIG. 34) of the current key scene exceeds a predetermined boundary, the slide shifting is performed. Conversely, when the drag touch input ends before the slide shifting is performed, the slide shifting may not be performed.

In the slideshow mode, a slide shifting between key scenes may be performed in a different way from the above-description depending on a drag touch input.

For example, when the drag touch input is received in the display window, a key scene may be shifted. In this case, a shifting rate may be determined depending on a length direction of the drag touch input instead of one key scene being shifted at a time. In detail, when the length of the drag touch is less than or equal to a predetermined length, the key scene may not be shifted. When the length of the drag touch is greater than or equal to the predetermined length, a current key scene may be shifted to a following key scene at a predetermined interval. As the length of the drag touch increases, the predetermined interval may decrease. Similarly, as the length of the drag touch increases, the number of key scenes shifted may increase while the predetermined interval is maintained.

Figure 35:
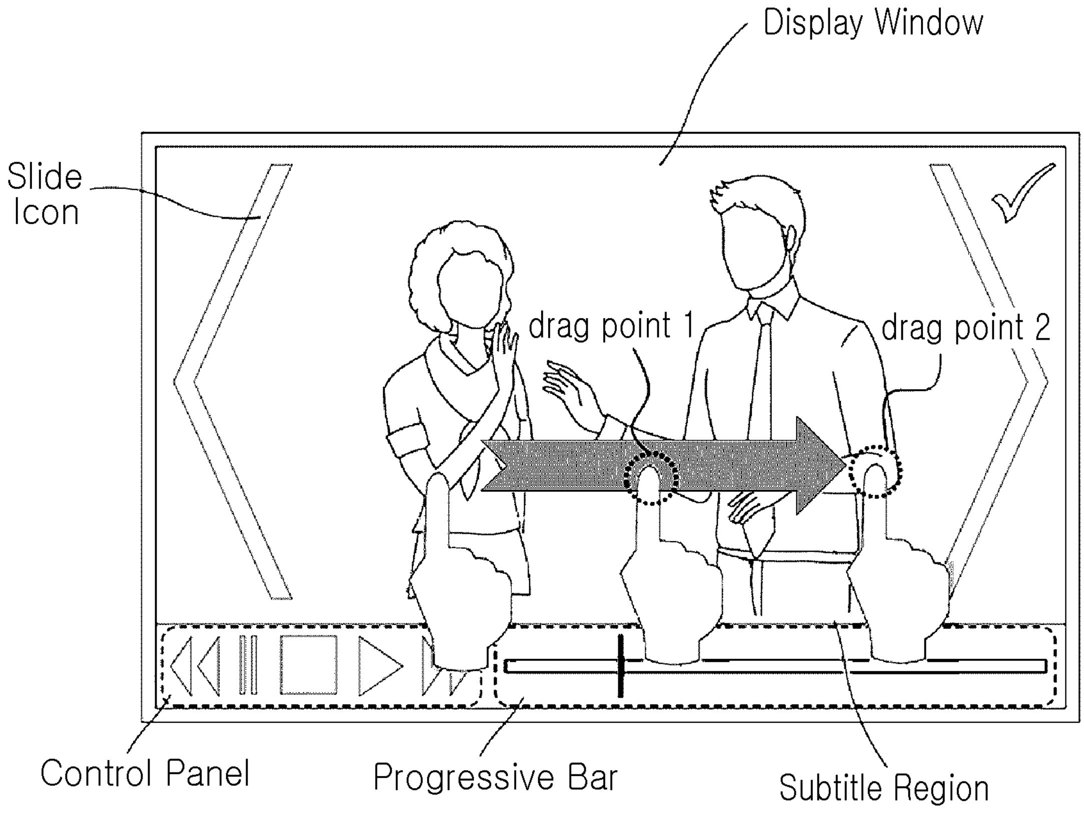
FIG. 35 is a diagram showing an example of a slide shifting method in a slideshow mode according to an embodiment of the present invention.

FIG. 35 is a diagram showing an example of a slide shifting method in the slideshow mode according to an embodiment of the present invention. Referring to FIG. 35, a key scene shifting may be performed once per second when a drag touch is applied up to a first drag point, and may be performed ten times per second when the drag touch is applied up to a second drag point. In this case, the key scene shifting may be performed with a visual effect similar to a case in which a page of a paper book is turned instead of a simple screen switch.

Figure 36:
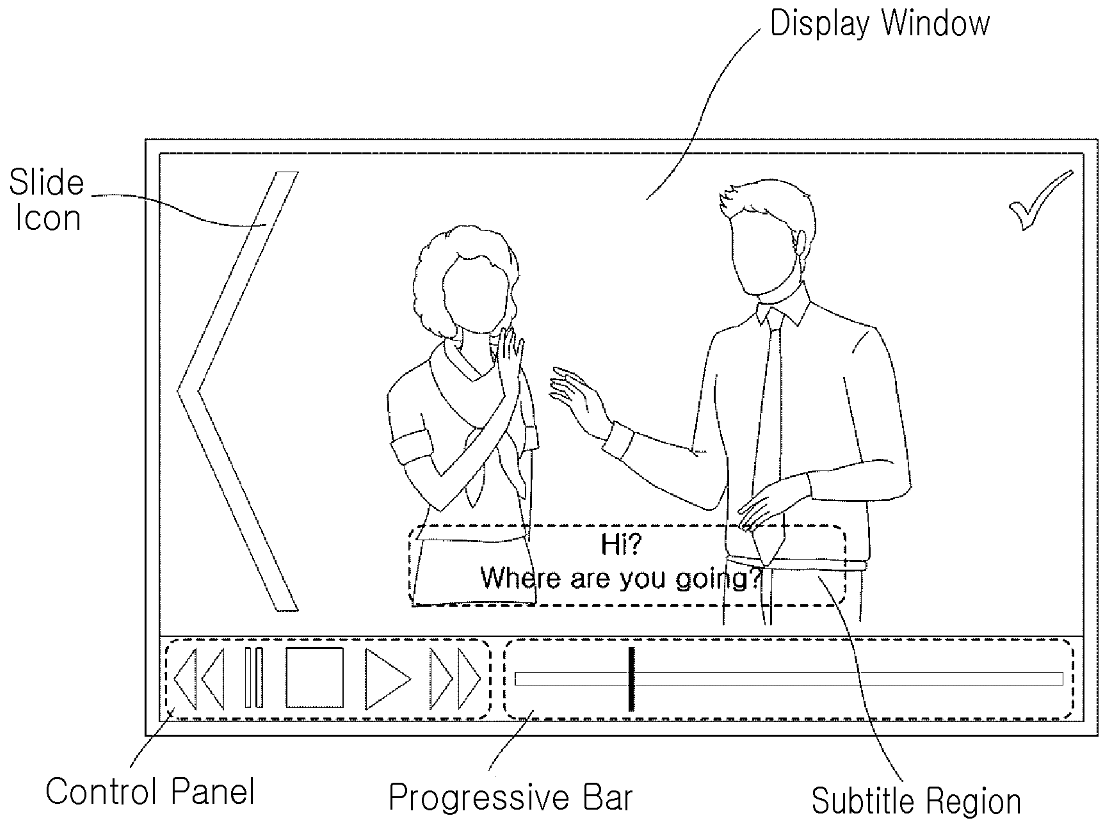
FIG. 36 is a diagram showing omission of a slide icon in a slideshow mode according to an embodiment of the present invention.

When the slide shifting is repeated, the final key scene among several key scenes may be output as a result. In this case, a user may be informed that the current key scene is the final key scene through the default screen. For example, when the final key scene is reached, the electronic device 1000 may omit a slide icon for shifting to a following key scene from the default screen. FIG. 36 is a diagram showing omission of a slide icon in the slideshow mode according to an embodiment of the present invention. In FIG. 36, it can be seen that the slide icon for shifting to a following key scene is not displayed as a result of reaching the last key scene. Conversely, a slide icon for shifting to a preceding key scene may not be displayed while the first key scene is output.

Figure 37:
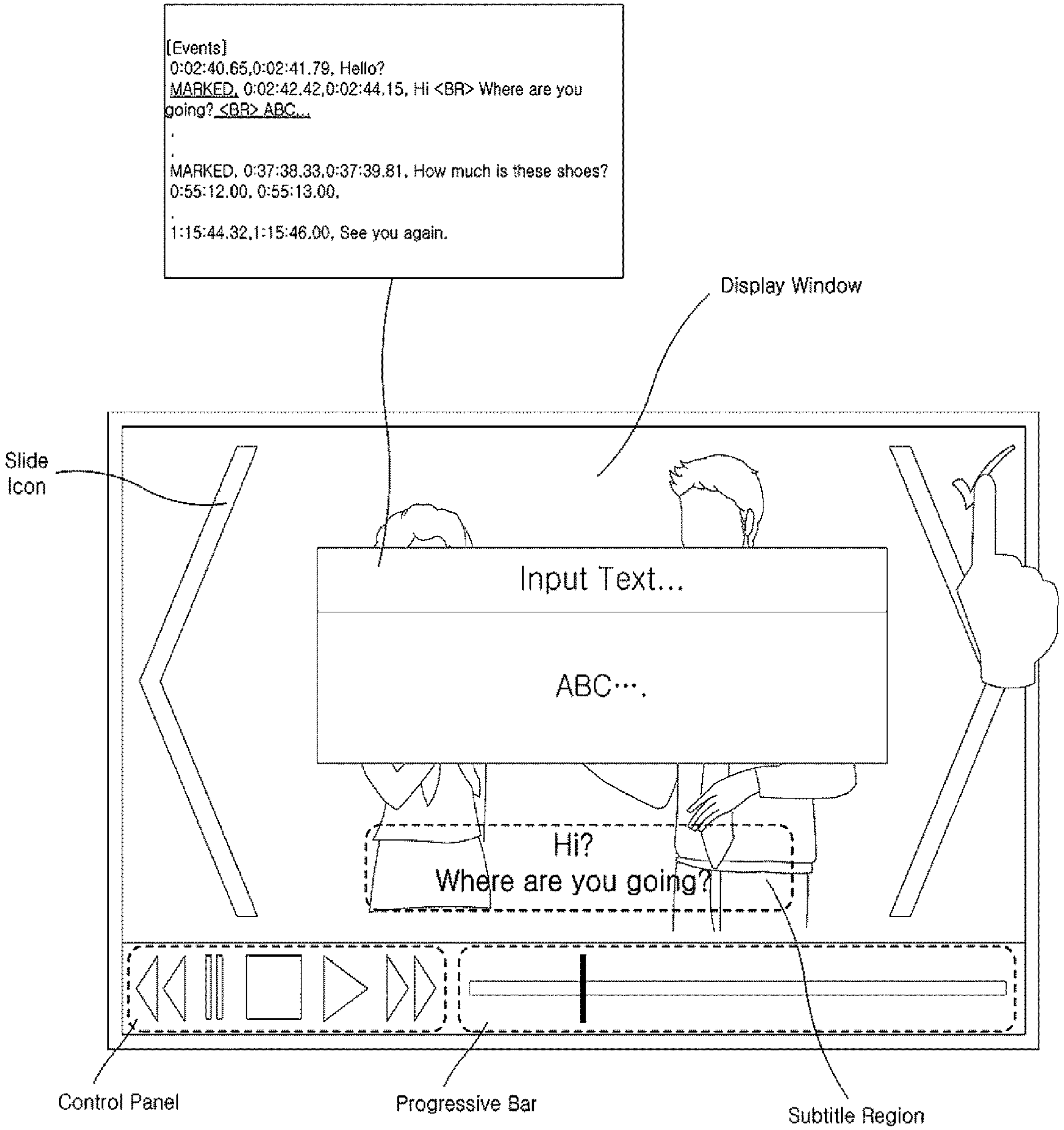
FIG. 37 is a diagram showing bookmark setting in a slideshow mode according to an embodiment of the present invention.

Next, the bookmark setting will be described. FIG. 37 is a diagram showing a bookmark setting in the slideshow mode according to an embodiment of the present invention. According to FIG. 37, when a user input selecting a bookmark icon of the default screen occurs, a bookmark may be set for a current playback time point in the video mode or the slide mode. When a bookmark is set in this way, a corresponding scene is set as a bookmarked key scene. Referring to FIG. 37, it can be seen that a bookmark is set for a comment for a corresponding key scene.

Also, a character input window for generating additional information may be provided when a bookmark is set in this way. When a character string is input into the window by a user, text may be displayed together with a corresponding comment. The text that is input as the additional information may be displayed to have different comment attributes from original comments. When a bookmark is set for a position at which there is no comment, a dummy comment is generated.

Various user interfaces may be used in addition to the method for selecting a bookmark button shown in FIG. 37 for bookmarking.

Figure 38:
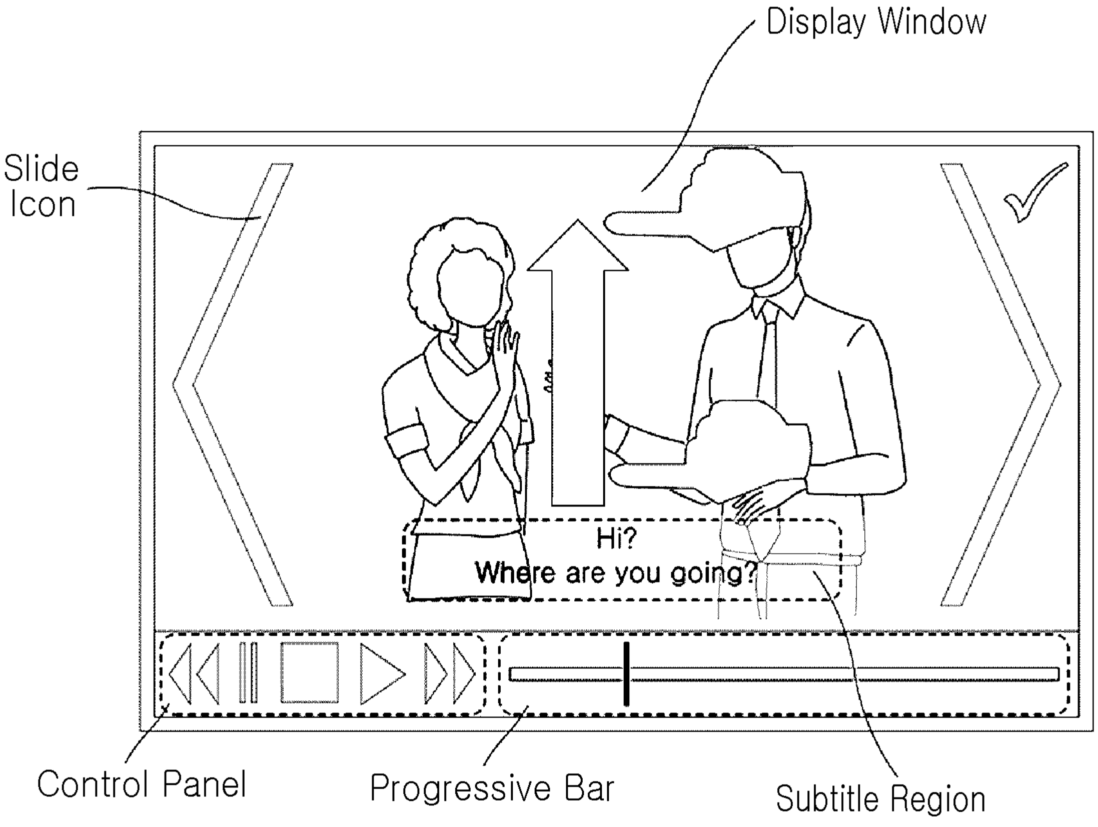
FIG. 38 is a diagram showing an example of a user interface for setting a bookmark in a slideshow mode according to an embodiment of the present invention.

FIG. 38 is a diagram showing an example of a user interface for setting a bookmark in the slideshow mode according to an embodiment of the present invention. Referring to FIG. 38, when a down-to-up touch input is received in a display window, a key scene displayed in the display window may be bookmarked.

The term "bookmarking" has been used herein, but is not to be interpreted as a narrow meaning of bookmarking that is generally set for multimedia content. The term should be understood as an action of storing and recording a corresponding scene so that the corresponding scene may be managed separately from other key scenes.

Figure 39:
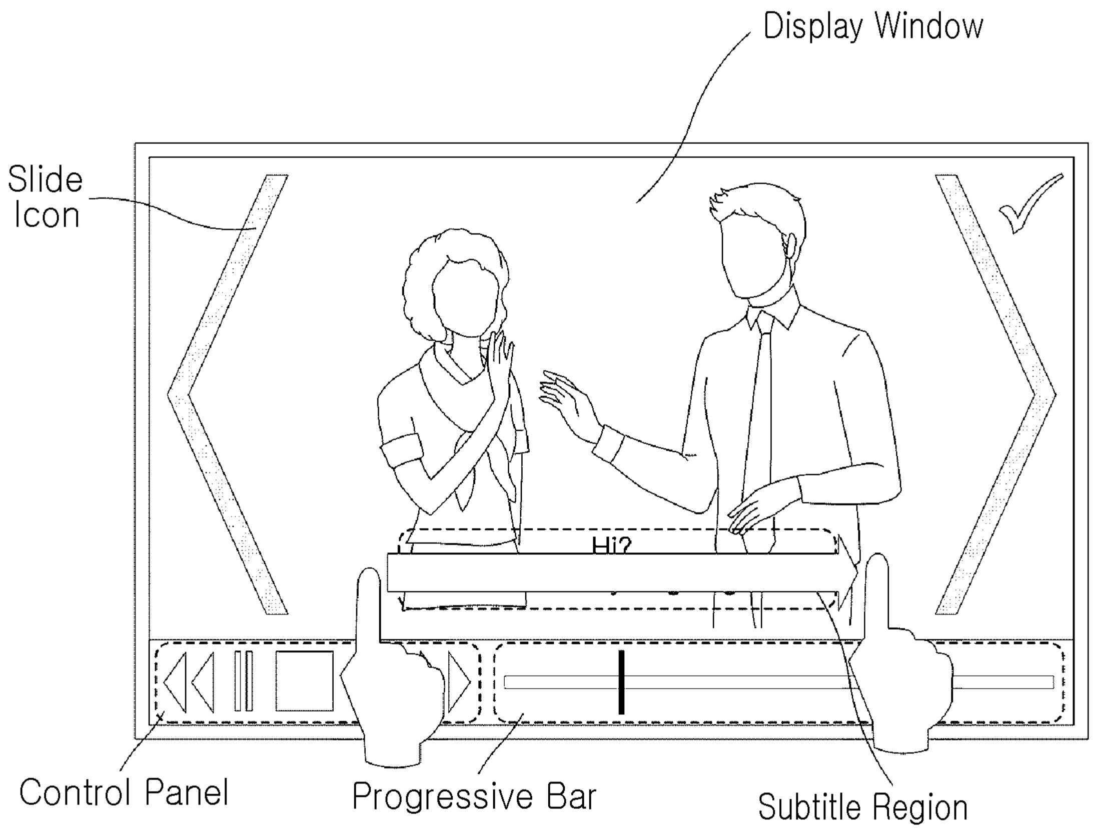
FIG. 39 is a diagram showing a touch input for a bookmark shifting according to an embodiment of the present invention.

A bookmark shifting using the bookmark that is set in this way may be performed as follows. FIG. 39 is a diagram showing a touch input for a bookmark shifting according to an embodiment of the present invention. The bookmark shifting may be performed according to a horizontal drag touch input. Here, the bookmark shifting may be performed when a drag touch input is applied to a subtitle region. However, such a drag touch input may refer to a movement of a predetermined distance or more in the horizontal direction. In other words, the above-described slide shifting and bookmark shifting may be distinguished depending on a drag distance. For example, when a drag is performed for less than the predetermined distance, the slide shifting may be performed. When the drag is maintained for more than the predetermined distance, the bookmark shifting may be performed. As in the case of the slide shifting, whether to shifting to a preceding or following bookmark may be set according to a drag direction.

Figure 40:
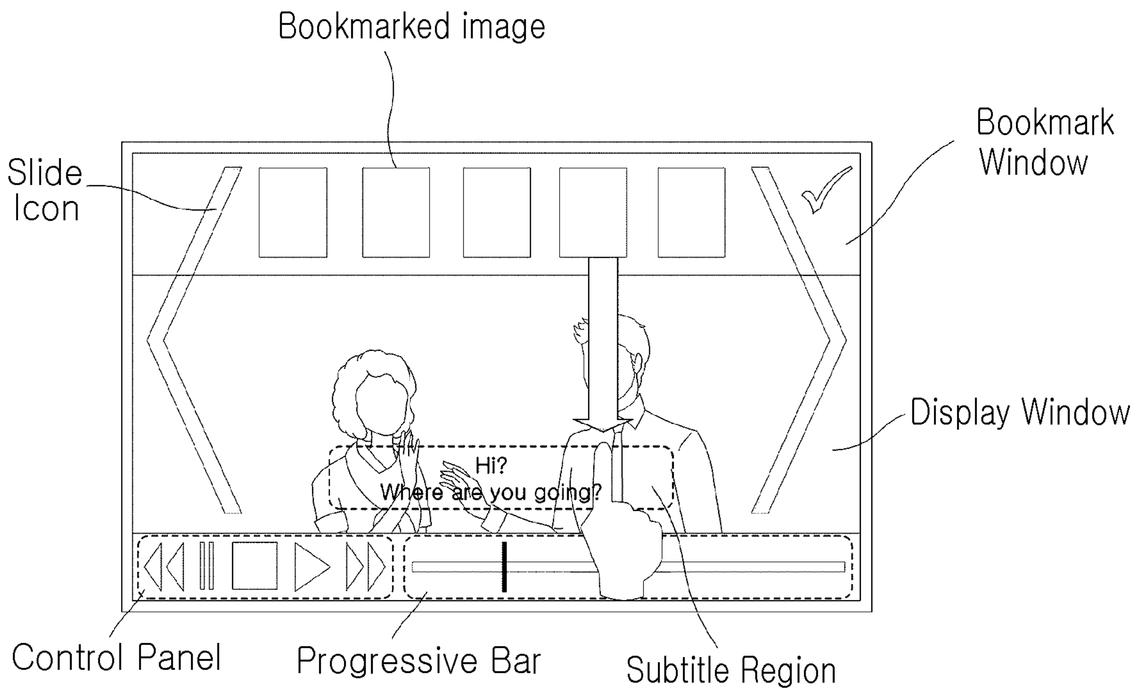
FIG. 40 is a diagram showing displaying of a bookmark list according to an embodiment of the present invention.

The electronic device 1000 may display a list of bookmarked key scenes. FIG. 40 is a diagram showing displaying of a bookmark list according to an embodiment of the present invention. Referring to FIG. 40, in the slideshow mode, images of bookmarked key scenes may be listed and displayed. For example, when a vertical drag touch input is applied (e.g., in the downward direction), the electronic device 1000 may move a display window down according to a degree of the drag, list bookmarked core images in chronological order, and display the listed core images in an empty space in which the display window was positioned.

In this situation, when an image is selected from among the listed images by a user, a playback time point may be shifted to the bookmarked core image, which is a still image, and the still image may be displayed.

When a horizontal drag touch occurs while the bookmarks are being displayed, the listing of the bookmarks may be released.

Figure 41:
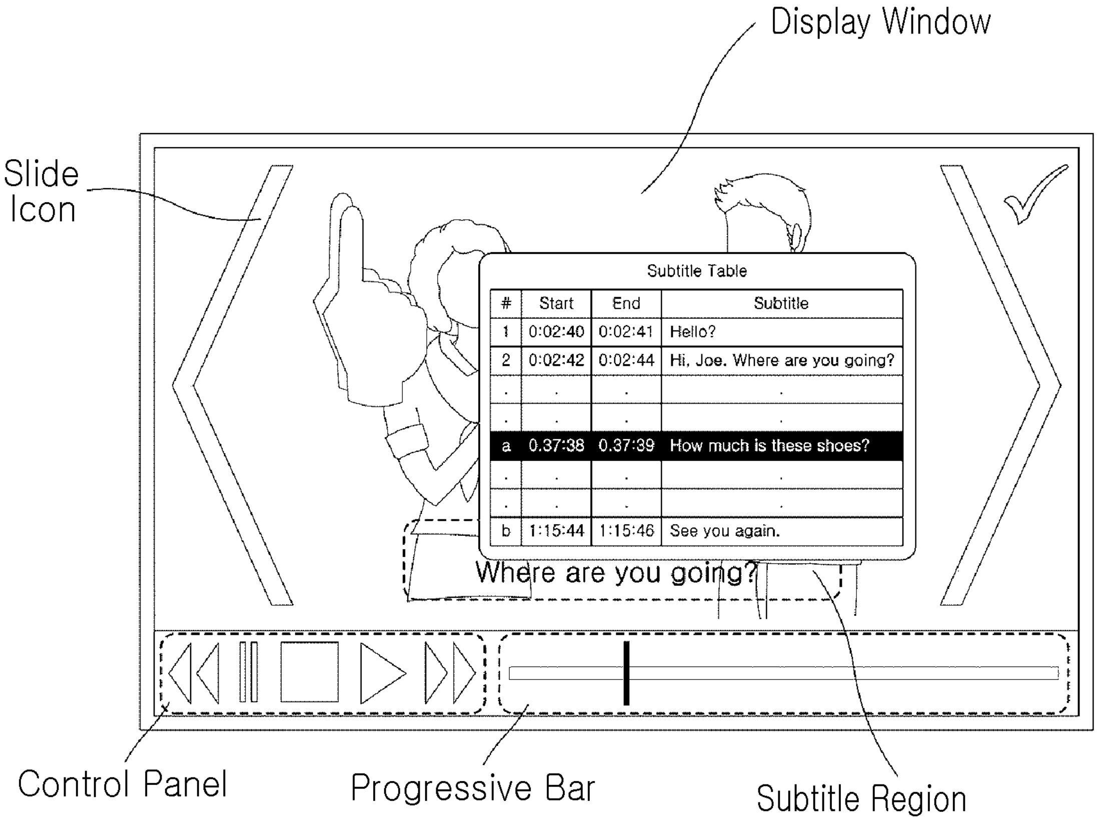
FIG. 41 is a diagram showing a subtitle event browser according to an embodiment of the present invention.

Also, the electronic device 1000 may provide a function of browsing all event time points having comments. FIG. 41 is a diagram showing a browser for an EV time according to an embodiment of the present invention. Referring to FIG. 41, in the slideshow mode, an event browser in which event time points are listed may be displayed according to a user input. A double touch may be used as the user input. The event browser may include start points, end points, and text details of all event sections. Here, when a user input for selecting any one of the listed event sections occurs, a playback time point may be shifted to a time point of a core image of the selected event section.

The above-described slideshow mode may be performed using content pre-stored in the memory 1400 of the electronic device 1000. However, in some cases, the slideshow mode may be executed while data regarding the content is received from an external device in a streaming manner. For example, the data regarding the content may be transmitted through the communication unit 1300 of the electronic device 1000 from an external device, and the electronic device 1000 may temporarily store the data regarding the content in a buffer and reproduce the content while reading the buffer.

Here, the electronic device 1000 may receive a still image of a key scene to be displayed in the slideshow mode first. Generally, in a video streaming service, image data for playing a video is sequentially received beginning with a playback time point. However, according to the present invention, a still image of a key scene may be transmitted earlier than image data is received. The still image of the key scene has a much smaller size than a video. Accordingly, even when it is difficult to reproduce content as a video due to a low transmission rate, the electronic device 1000 may reproduce content in the slideshow mode by receiving a key scene first. To this end, the electronic device 1000 may receive comment data first.

When still images of a key scene are acquired first as described above, the still images may be received in order from a still image closest to a current playback time point to smoothly play a slideshow.

<Content Reproduction Method>

A content reproduction method according to an embodiment of the present invention will be described below.

First, the electronic device 1000 may acquire content. In detail, the controller 1500 may read content pre-stored in the memory 1400 or may download content from the outside through the communication unit 1300. Here, the content may be image data. When the content is received in a streaming manner, still image data for a key scene may be downloaded before video data. In this case, the download may be performed in order from a key scene closest to a current playback time point among key scenes.

Also, the electronic device 1000 may acquire event information regarding event time points. Here, an event is a concept including a dummy event having an empty comment. Also, an EV time may refer to a start time point or end time point of an event section, and event information may refer to comment data. The controller 1500 may receive the comment data from an external device or may read comment data pre-stored in the memory 1400.

The electronic device 1000 may reproduce content in the video mode. The controller 1500 may reproduce the content as a video by decoding the content with an appropriate video codec.

Also, the electronic device 1000 may reproduce the content in the slideshow mode. The electronic device 1000 may sequentially display key scenes corresponding to EV times of the event information in the slideshow mode. Here, the key scene may be displayed as a still image, and the still image may be extracted from video of the content at the event time point. Alternatively, when the content includes still images for key scenes together with a video, the content may be reproduced in a slideshow manner by decoding the still images with a still image codec.

The video mode and the slideshow mode may be switched between. When the video mode is switched to the slideshow mode, the slideshow mode is entered by outputting a key scene closest to a playback time point in the video mode as a still image. Conversely, when the video mode is entered from the slideshow mode, a reproduction in the video mode may be started at a playback time point of a key scene or a time point a predetermined time before or after the reproduction time period.

In the slideshow mode, a slide shifting between core images may be performed, and this has been described above in detail.

The above description is merely illustrative of the technical spirit of the present invention, various modifications and changes may be made by those skilled in the art without departing from the subject matter of the present invention. Accordingly, the above-described embodiments of the present invention may be implemented separately or in combination.

Therefore, the embodiments disclosed herein are intended not to limit but to describe the technical spirit of the present invention, and the scope of the present invention is not limited to the embodiments. The scope of the invention should be construed by the appended claims, and the technical spirit within the scope of their equivalents should be construed as being included in the scope of the invention.

MODE OF THE INVENTION

As described above, relevant matters have been described in the best mode for carrying out the invention.

INDUSTRIAL APPLICABILITY

As described above, the present invention may be entirely or partially applied to a multimedia content generation and reproduction method, an electronic device for performing the same, and a recording medium having a program for executing the same stored therein.

The invention claimed is:

1. A method for navigating multimedia content, the method comprising:

displaying the multimedia content in a first window, displaying at least one marked information is displayed in a second window which is different from the first window, wherein each of the at least one marked information comprises:

one of the at least one time point information, one of the at least one summary text information corresponding to the one time point, and one of the at least one key scene image corresponding to the one time point;

receiving, via the at least one marked information in the second window, a user input;

in response to the user input, determining a specific time point based on the user input, wherein the specific time point is associated with time point information which is included in the selected section information;

in response to the user input, changing a time point from a previous time point to the determined specific time point, and in response to the user input, reproducing the multimedia content in the first window from the specific time point when the multimedia content is reproduced according to a first mode, or displaying a still image of the specific time point in the first window when the multimedia content is reproduced according to a second mode, wherein:

the still image is a part of the multimedia content corresponding to the specific time point, the multimedia is played when the multimedia is reproduced according to the first mode, and the multimedia is paused when the multimedia is reproduced according to the second mode.

2. The method of claim 1, wherein:

the multimedia is played when the multimedia is reproduced according to the first mode, and the multimedia is paused when the multimedia is reproduced according to the second mode.

3. The method of claim 2, wherein:

the first mode is a video mode, and the second mode is a slideshow mode.

4. The method of claim 1, further comprising:

displaying a bar associated with the multimedia content; and displaying at least one marked indicator on the bar, wherein each of the at least one marked indicator corresponds to each of the at least one marked information.

5. The method of claim 4, wherein a position of the at least one marked indicator on the bar is determined based on the time point information of the corresponding marked information.

6. The method of claim 1, wherein displaying the at least one marked information in the second window comprises:

displaying the at least one time point information, displaying the at least one summary text information, and displaying the at least one key scene image.

7. The method of claim 1, wherein displaying the at least one marked information in the second window comprises at least:

displaying a first marked information comprising first time point information, first summary text information and a first key scene image; and displaying a second marked information comprising second time point information, second summary text information and a second key scene image.

8. The method of claim 1, wherein the displayed at least one marked information is scrollable.

9. The method of claim 1, wherein the displayed at least one marked information is page-shiftable.

10. The method of claim 1, further comprising:

diminishing the displayed at least one marked information according to a user input.

11. The method of claim 1, wherein the specific time point is earlier than a reproducing time of the key scene image corresponding to the specific time point.

12. A method for navigating multimedia content, the method comprising:

displaying the multimedia content in a first window, displaying at least one marked information is displayed in a second window which is different from the first window, wherein each of the at least one marked information comprises:

one of the at least one time point information, one of the at least one summary text information corresponding to the one time point, and one of the at least one key scene image corresponding to the one time point;

receiving, via the at least one marked information in the second window, a user input;

in response to the user input, determining a specific time point based on the user input, wherein the specific time point is associated with time point information which is included in the selected section information;

in response to the user input, changing a time point from a previous time point to the determined specific time point, and in response to the user input, reproducing the multimedia content in the first window from the specific time point when the multimedia content is reproduced according to a first mode, or displaying a still image of the specific time point in the first window when the multimedia content is reproduced according to a second mode, wherein:

the still image is a part of the multimedia content corresponding to the specific time point, and the first mode is a video mode, and wherein the second mode is a slideshow mode.

* * * * *